(12) United States Patent  
Massof et al.

(10) Patent No.: US 6,529,331 B2
(45) Date of Patent: Mar. 4, 2003

(54) HEAD MOUNTED DISPLAY WITH FULL FIELD OF VIEW AND HIGH RESOLUTION

(75) Inventors: Robert W. Massof, Pasadena, MD (US); Lawrence G. Brown, Sparks, MD (US); Marc D. Shapiro, Baltimore, MD (US)

(73) Assignee: Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/839,670

(22) Filed: Apr. 20, 2001

(65) Prior Publication Data

US 2002/0181115 A1 Dec. 5, 2002

(51) Int. Cl.⁷ .......................... G02B 27/14; G09G 5/00; G02F 1/1335
(52) U.S. Cl. .................. 359/630; 345/9; 349/13
(58) Field of Search .................. 345/9; 359/630; 349/13

(56) References Cited

U.S. PATENT DOCUMENTS

| 5,050,966 A | 9/1991 | Berman ...................... 349/194 |
| 5,129,716 A | 7/1992 | Holakovszky et al. ........ 351/50 |
| 5,130,794 A | 7/1992 | Ritchey ........................ 348/39 |
| 5,151,722 A | 9/1992 | Massof et al. ............... 351/158 |
| 5,233,458 A | 8/1993 | Moffitt et al. ............... 359/227 |
| 5,371,556 A | 12/1994 | Suwa et al. .................. 351/158 |
| 5,392,158 A | 2/1995 | Tosaki ........................ 359/633 |
| 5,408,346 A | 4/1995 | Trissel et al. ............... 349/115 |
| 5,414,544 A | 5/1995 | Aoyagi et al. ................ 349/13 |
| 5,446,834 A | 8/1995 | Deering ...................... 345/427 |
| 5,467,104 A | 11/1995 | Furness, III et al. ............ 345/8 |
| 5,497,270 A | 3/1996 | Rud ........................... 359/629 |
| 5,621,572 A | 4/1997 | Fergason ..................... 359/630 |
| 5,659,327 A | 8/1997 | Furness, III et al. ............ 345/8 |
| 5,703,604 A | * 12/1997 | McCutchen ................. 345/121 |
| 5,715,023 A | 2/1998 | Hoppe ........................ 349/11 |
| 5,751,259 A | 5/1998 | Iwamoto ....................... 345/8 |
| 5,805,341 A | 9/1998 | Kuba .......................... 359/630 |
| 5,822,127 A | 10/1998 | Chen et al. .................. 359/631 |
| 5,825,539 A | 10/1998 | Hoshi ......................... 359/462 |
| 5,828,410 A | 10/1998 | Drapeau ...................... 348/383 |

(List continued on next page.)

FOREIGN PATENT DOCUMENTS

EP 0 301 473 2/1989

OTHER PUBLICATIONS

J. Brooker et al., "A helmet mounted display system with active gaze control for visual telepresence," Mechatronics 9 (1999) pp. 703–716.

Primary Examiner—Georgia Epps
Assistant Examiner—David N. Spector
(74) Attorney, Agent, or Firm—Peter F. Corless; Steven M. Jensen; Edwards & Angell, LLP

(57) ABSTRACT

A head mounted virtual environment display with high visual resolution and a full field of view is disclosed. The display uses an optical system in which the video displays and corresponding lenses are positioned tangent to hemispheres with centers located at the centers of rotation of a user's eyes. Centering the optical system on the center of rotation of the eye allows both a full field of view and high fidelity visual resolution, without compromising visual resolution. A multi-panel video wall design for the video displays allows each lens facet to image a miniature flat panel display at optical infinity. The flat panel displays are centered on the optical axes of the lens facets. A parallel graphics architecture uses data from high resolution and accuracy head trackers and built-in eye trackers to generate high detail 3D models at high frame rates with minimal perceptible lag. Resolution for central vision is optimized with a roaming high level of detail window, and slip artifacts associated with rapid head movements are eliminated using freeze-frame.

53 Claims, 21 Drawing Sheets

U.S. PATENT DOCUMENTS

| | | | |
|---|---|---|---|
| 5,835,279 A | 11/1998 | Marshall et al. | 359/645 |
| 5,912,650 A | 6/1999 | Carollo | 345/7 |
| 5,943,171 A | 8/1999 | Budd et al. | 359/631 |
| 5,995,291 A | 11/1999 | Togino | 359/631 |
| 6,038,054 A | 3/2000 | Sakai et al. | 359/253 |
| 6,078,427 A | 6/2000 | Fontaine et al. | 359/630 |
| 6,094,309 A | 7/2000 | Ophey | 359/630 |
| 6,144,347 A | 11/2000 | Mizoguchi et al. | 345/8 |
| 6,160,667 A | 12/2000 | Smoot | 359/630 |

\* cited by examiner

HEAD MOUNTED DISPLAY WITH FULL FIELD OF VIEW AND HIGH RESOLUTION

FIELD OF INVENTION

The present invention relates to head mounted video displays for presenting virtual environments, and more particularly to a binocular head-mounted video display with full field of view and high resolution video images.

BACKGROUND OF THE INVENTION

Traditionally, displays of virtual environments have been used for entertainment purposes, such as presenting the environments for the playing of various video games. More recently, such displays have been considered for other applications, such as possible tools in the process of designing, developing, and evaluating various structures and products before they are actually built. The advantages of using virtual displays as design and development tools include flexibility in modifying designs before they are actually built and savings in the costs of actually building designs before they are finalized.

To be a useful and valid design and development tool, however, a virtual display system must be capable of generating high fidelity, interactive, virtual environments that provide correct "feelings of space" (FOS) and "feelings of mass" (FOM). Such a system must also allow users to function "naturally" within the virtual environment and not experience physical or emotional discomfort. It must also be capable of displaying a virtual environment with dynamics matched to the dynamics of human vision and motor behavior so there is no perceptible lag or loss of fidelity.

FOS and FOM are personal perceptual experiences that are highly individual. No two people are likely to agree on FOS and FOM for every environment. Also, there are likely to be variations between people in their judgments of FOS and FOM within a virtual environment, as compared to FOS and FOM in the duplicated real environment. Thus, preferably a virtual display system will provide feelings of space and mass that are based on a more objective method of measuring FOS and FOM that does not rely on personal judgments of a particular user or a group of users.

With regard to human vision, typically there are "natural behaviors" in head and eye movements related to viewing and searching a given environment. One would expect, and a few studies confirm, that visual field restrictions (e.g., with head mounted telescopes) result in a limited range of eye movements and increased head movements to scan a visual environment. Forcing a user of a virtual display system used as a design and development tool to adapt his or her behavior when working in a particular virtual environment could lead to distortions of visual perception and misjudgment on important design decisions. Thus, the ideal virtual display system will have sufficient field-of-view to allow normal and unrestricted head and eye movements.

Simulator sickness is a serious problem that has limited the acceptance of virtual reality systems. In its broadest sense, simulator sickness not only refers to feelings of dizziness and nausea, but also to feelings of disorientation, detachment from reality, eye strain, and perceptual distortion. Many of these feelings persist for several hours after use of a system has been discontinued. Most of the symptoms of simulator sickness can be attributed to optical distortions or unusual oculomotor demands placed on the user, and to perceptual lag between head and body movements and compensating movements of the virtual environment. Thus, preferably a virtual display system will eliminate simulator sickness.

One technology commonly used to present virtual environments are head mounted video displays. A head mounted display ("HMD") is a small video display mounted on a viewer's head that is viewed through a magnifier. The magnifier can be as simple as a single convex lens, or as complicated as an off-axis reflecting telescope. Most HMDs have one video display per eye that is magnified by the display optics to fill a desired portion of the visual field.

Since the first HMD developed by Ivan Sutherland at Harvard University in 1968, there has always been a trade-off between resolution and field of view. To increase field of view, it is necessary to increase the magnification of the display. However, because video displays have a fixed number of pixels, magnification of the display to increase field of view is done at the expense of visual resolution (i.e., visual angle of the display pixels). This is because magnification of the display also increases magnification of individual display pixels, which results in a trade-off between angular resolution and field of view for HMDs that use single displays. Normal visual acuity is 1 minute of arc (20/20). Legal blindness is a visual acuity of 10 minutes of arc (20/200). The horizontal extent of the normal visual field is 140° for each eye (90° temporal and 50° nasal). Thus, to fill the entire visual field with a standard SVGA image, one must settle for visual resolution that is worse than legal blindness.

One attempt to develop an HMD with both high visual resolution and a large monocular field of view was made by Kaiser Electro-Optic, Inc. ("KEO") under a contract with the Defense Advanced Research Projects Agency ("DARPA"). KEO developed an HMD that employed a multi-panel "video wall" design to achieve both high resolution with relatively low display magnification and wide field of view. The HMD developed by KEO, called the Full Immersion Head Mounted Display ("FIHMD"), had six displays per eye. Each display of the multiple displays forming the video wall was imaged by a separate lens that formed a 3×2 array in front of each eye. The horizontal binocular field of view of the FIHMD was 156° and the vertical was 50°. Angular resolution depended on the number of pixels per display. The FIHMD had 4 minarc per pixel resolution.

FIG. 1 is a plan view of the FIHMD, while FIG. 2 shows the optics 10 of the FIHMD. These optics included a continuous meniscus lens 12 ("monolens") between the eye (not shown) and the six displays 14 and a cholesteric liquid crystal ("CLC") filter 16 for each display 14. The meniscus lens 12 served as both a positive refracting lens and as a positive curved mirror. The CLC 16 reflected light from the displays 14 that passed through the meniscus lens 12 back onto the lens 12 and then selectively transmitted the light that was reflected from the lens' curved surface. Some versions of the FIHMD optical design employed Fresnel lenses as part of the CLC panel to increase optical power. This so-called "pancake window" (also called "visual immersion module" 18 or "VIM"), shown in FIG. 3, provided a large field of view that was achieved with reflective optics while folding the optical paths into a very thin package.

The FIHMD 20, shown in FIG. 1, could not provide a satisfactory full field of view. The FIHMD had limitations imposed by its use of the VIM optics and the requirement for adequate eye relief to accommodate spectacles 22. The radius of curvature of the meniscus lens 12 dictated the dimensions of the VIM 18 and, coupled with the eye relief requirement, determined the location of the center of curvature of display object space. Although no documentation is available that discusses the rationale for the design, as illustrated in FIG. 1, it appears that the centers of VIM field curvature 24 for the FIHMD 20 were set in the plane of a user's corneas. If the centers of the two VIM fields are separated by the typical interpupillary distance (68 mm), then the centers are located 12 mm behind the lens 23 of spectacles 22. This is the usual distance from a spectacle lens to the surface of the cornea. Because of this choice of centers, the FIHMD 20 had problems with visibility of seams between the displays 14 and with display alignment.

Normally, when the visual angle subtended by an object is measured, the apex of the cornea is used as the reference. Technically, for paraxial rays, the anterior nodal point of the eye, which is 7.2 mm posterior to the cornea, should be used as the reference. However, most object distances are large enough that a 7.2 mm error in the choice of reference is negligible. The FIHMD used the apex of the cornea as the center of curvature for its display field. But, in the case of FIHMD, the distances are small and the 7.2 mm error is significant.

Using the apex of the cornea as a reference overestimates the size of the visual field in an HMD. Such an overestimation only affects visual field and visual resolution specifications. However, a more serious problem is encountered when a viewer moves his eyes. Because the eye rotates about a point 13.5 mm posterior to the cornea, the apex of the cornea is translated as the eye rotates and the geometry of the optical system changes.

Display image overlap and image alignment in the FIHMD had to change with eye movements because the center of rotation of the eye is located 13.5 mm posterior to the front surface of the cornea. FIG. 4 is a plan view of a schematic ray tracing model 26 of the FIHMD optical configuration. In the model 26, the VIM modules 18 are replaced with single Fresnel lenses 28 that image the flat panel displays 14 at infinity. For on-axis viewing of the nasal-most display 14A (top of FIG. 4), there is sufficient image overlap to produce a seamless montage 30 in the retinal image 32. Consequently, if a user of the FIHMD stares straight ahead, he will experience a wide field of view and a seamless image.

When a user rotates his eye 34 to change the direction of gaze, the display images shift on the retina 35 by different amounts and the seamless montage breaks up. FIG. 5 illustrates, with the same model used in FIG. 4, the effects of eye movements in the FIHMD on the retinal image 32. In this example, the observer has turned his eye 34 temporally to fixate the center of the display 14B located 30 degrees away from the display 14A that was fixated in FIG. 4. Because the eye 34 rotates about a point 13.5 mm behind the cornea, instead of at the corneal apex 36 (which is the center of the sphere tangent to the optical and display array), the eye 34 translates relative to the optic axes of the FIHMD. To fixate the center of the 30° display, the eye rotates 23° and, relative to the optic axes, translates 1 mm on the z-axis and 5.2 mm on the x-axis. This translation of the eye's optics relative to the display optics introduces prism and vignetting. The result is that the display images on the retina were separated, shown as 30A in FIG. 5, by large gaps 38 (>5°), which are represented by the black areas in the ray tracing model 26. As the observer looks around, he would see gaps between the displays changing in prominence, and he most likely would see movement of the display images (particularly with smooth pursuit eye movements). Thus, the FIHMD suffered from montage image break-up as a user rotated his eyes within the device.

SUMMARY OF THE INVENTION

It is an object of the present invention to provide a head mounted display for presenting virtual environments with improved high resolution and full field of view.

It is another object of the present invention to provide a head mounted display for presenting virtual environments with improved high resolution and full field of view and that satisfies the requirements of human vision and motor behavior.

It is a further object of the present invention to provide a head mounted display for rendering virtual environments with high enough fidelity to produce correct feelings of space and mass and without simulator sickness.

It is yet another object of the present invention to provide a head mounted virtual environment video display which solves the montage image break-up problem of the FIHMD.

The present invention solves the montage image break-up problem of the FIHMD, while achieving both high visual resolution and a full field of view. The present invention uses an optical system in which the video displays and corresponding lenses are positioned tangent to hemispheres with centers located at the centers of rotation of a user's eyes. Centering the optical system on the center of rotation of the eye is the principal feature of the present invention that allows it to achieve both high fidelity visual resolution and a full field of view without compromising visual resolution.

The HMD of the present invention uses a simpler optical design than that used by the FIHMD. The present invention uses an array of lens facets that are positioned tangent to the surface of a sphere. The center of the sphere is located at an approximation of the "center of rotation" of a user's eye. Although there is no true center of eye rotation, one can be approximated. Vertical eye movements rotate about a point approximately 12 mm posterior to the cornea and horizontal eye movements rotate about a point approximately 15 mm posterior to the cornea. Thus, the average center of rotation is 13.5 mm posterior to the cornea.

The present invention also uses a multi-panel video wall design for the HMD's video display. Each lens facet images a miniature flat panel display which can be positioned at optical infinity or can be adjustably positioned relative to the lens facet. The flat panel displays are centered on the optical axes of the lens facets. They are also tangent to a second larger radius sphere with its center also located at the center of rotation of the eye. The present invention also includes high resolution and accuracy head trackers and built-in eye trackers. One or more computers having a parallel graphics architecture drives the head mounted display and uses data from these trackers to generate high detail 3D models at high frame rates with minimal perceptible lag. This architecture also optimizes resolution for central vision with a roaming high level of detail window and eliminates slip artifacts associated with rapid head movements using freeze-frame. The result is a head mounted display that renders virtual environments with high enough fidelity to produce correct feelings of space and mass, and which does not induce simulator sickness.

BRIEF DESCRIPTION OF THE DRAWINGS

For a fuller understanding of the nature of the present invention, reference is made to the following detailed description taken in conjunction with the accompanying drawing figures wherein like reference characters denote corresponding parts throughout the several views and wherein.

DETAILED DESCRIPTION OF THE INVENTION INCLUDING THE PREFERRED EMBODIMENT(S)

A head mounted display (HMD) is disclosed, the HMD having for each eye of the user the following: a plurality of lenses positioned tangent to a surface of a first sphere, the first sphere having a center that is located substantially at a center of rotation of the user's eye; a plurality of displays positioned tangent to a surface of a second sphere, the second sphere having a center that is located substantially at a center of rotation of the user's eye; and wherein each of the displays corresponds to at least one of the lenses and is imaged by the corresponding lens. The present invention will now be described by way of illustrative, but non-limiting examples with reference to the accompanying drawings.

Figure 1:
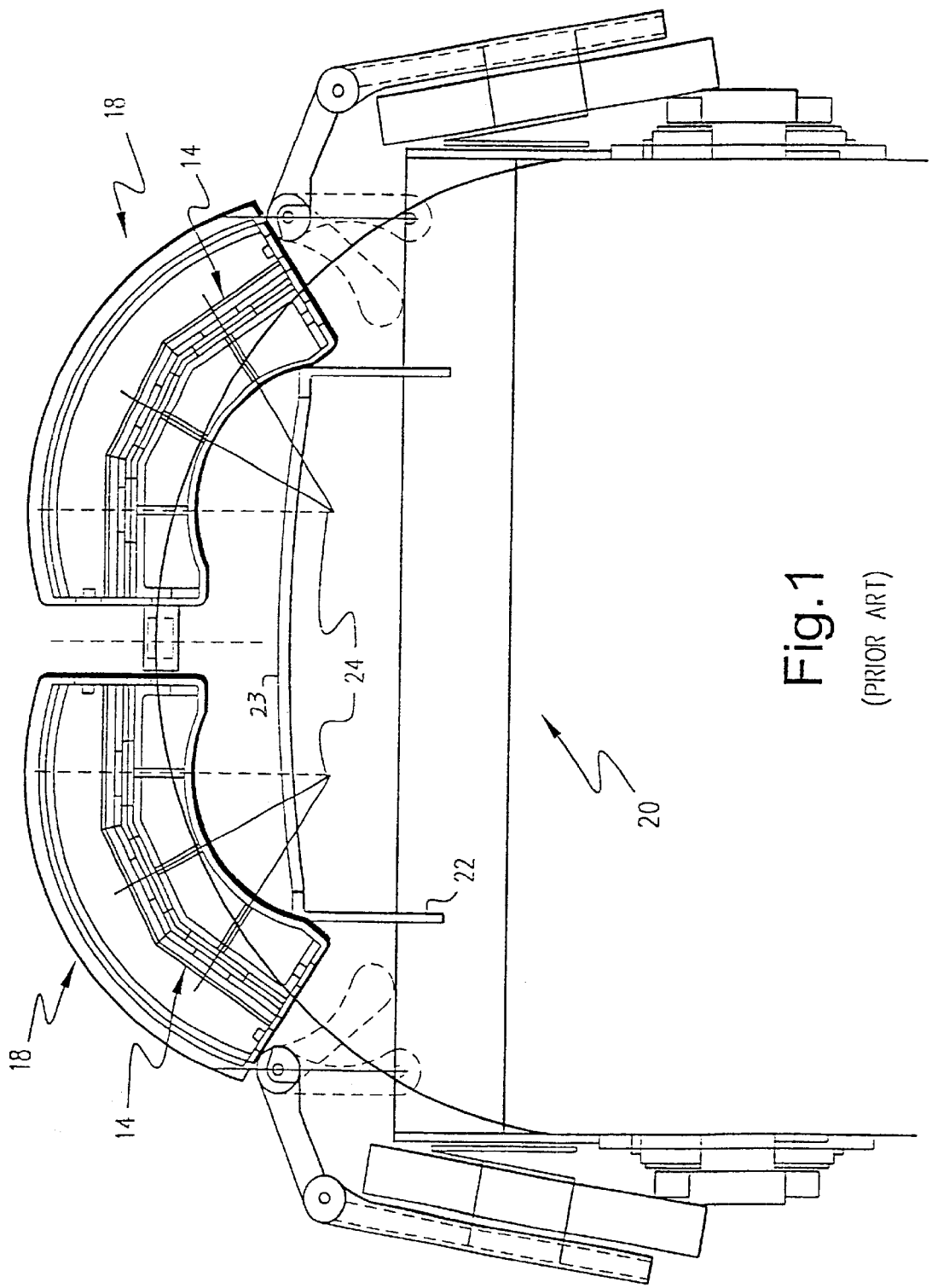
FIG. 1 is a plan view of the FIHMD.
Figure 2:
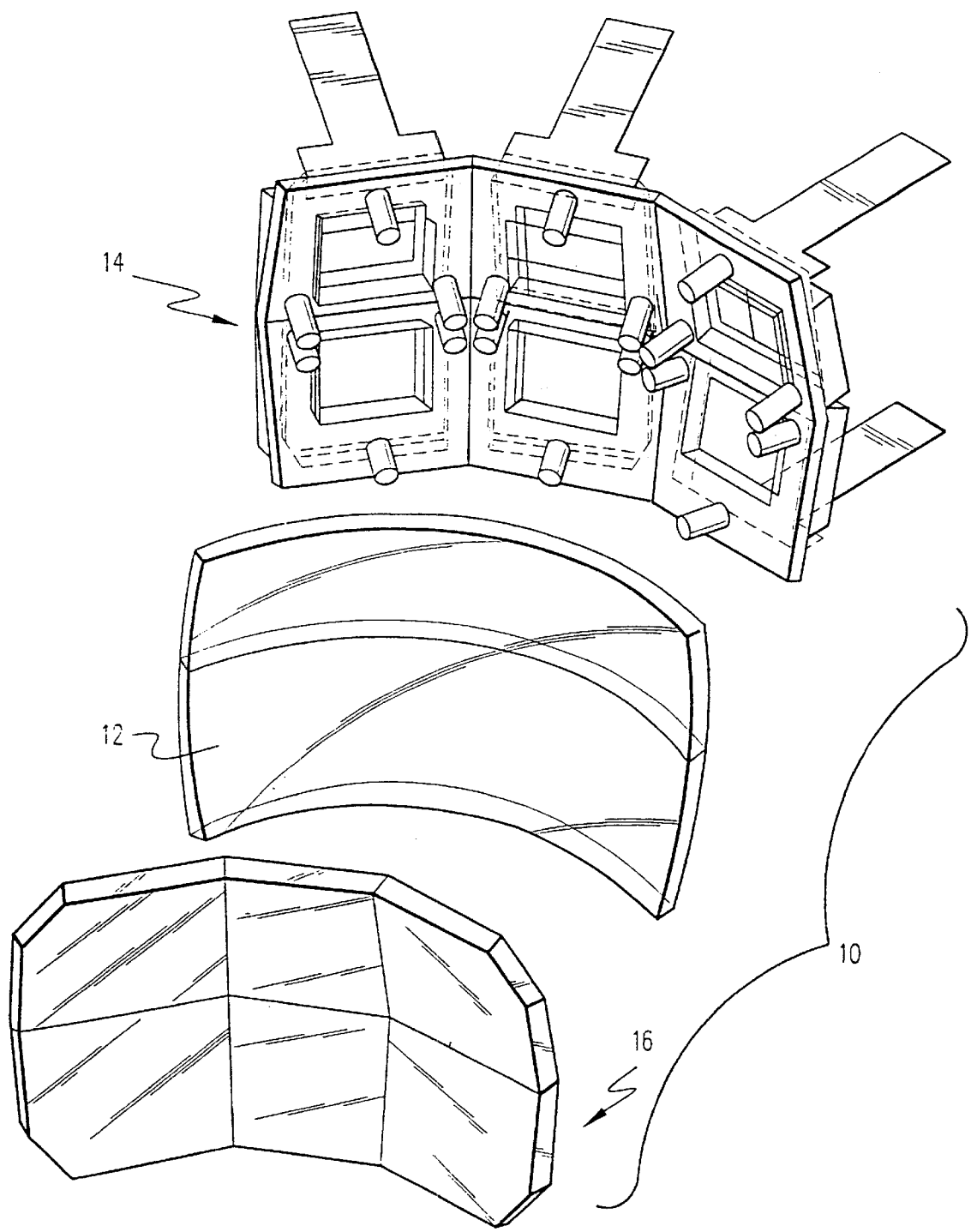
FIG. 2 is an exploded view of the optical components used in the FIHMD.
Figure 3:
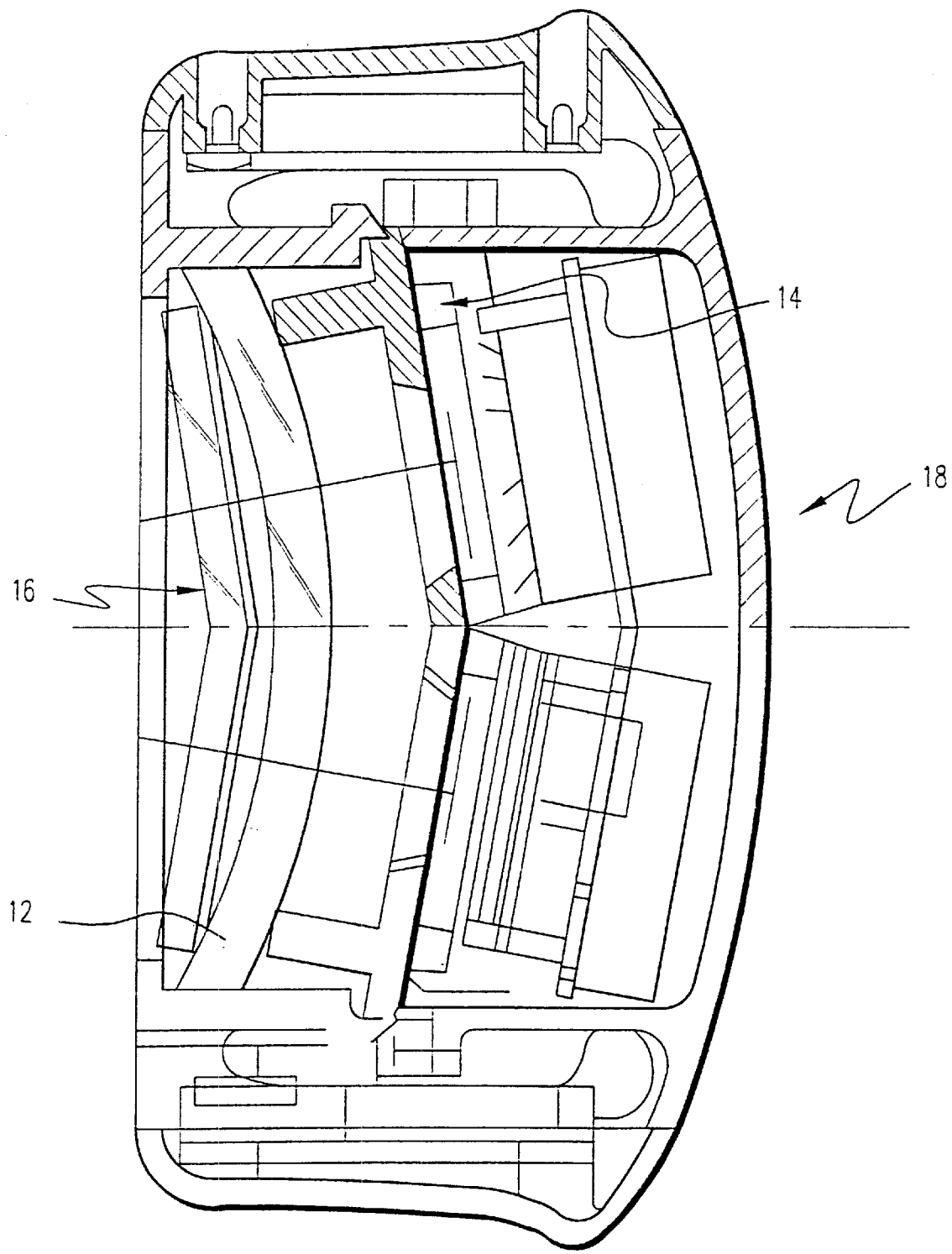
FIG. 3 is a plan view of the VIM used in the FIHMD.
Figure 4:
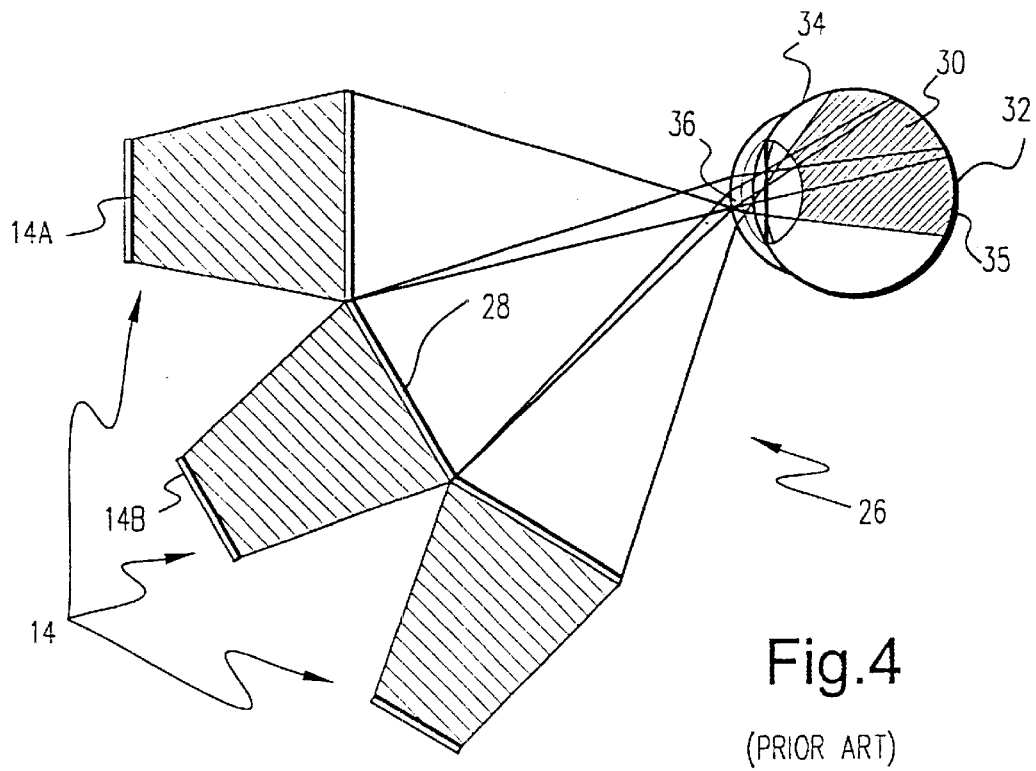
FIG. 4 is a plan view of a schematic ray tracing model of the FIHMD optical configuration.
Figure 5:
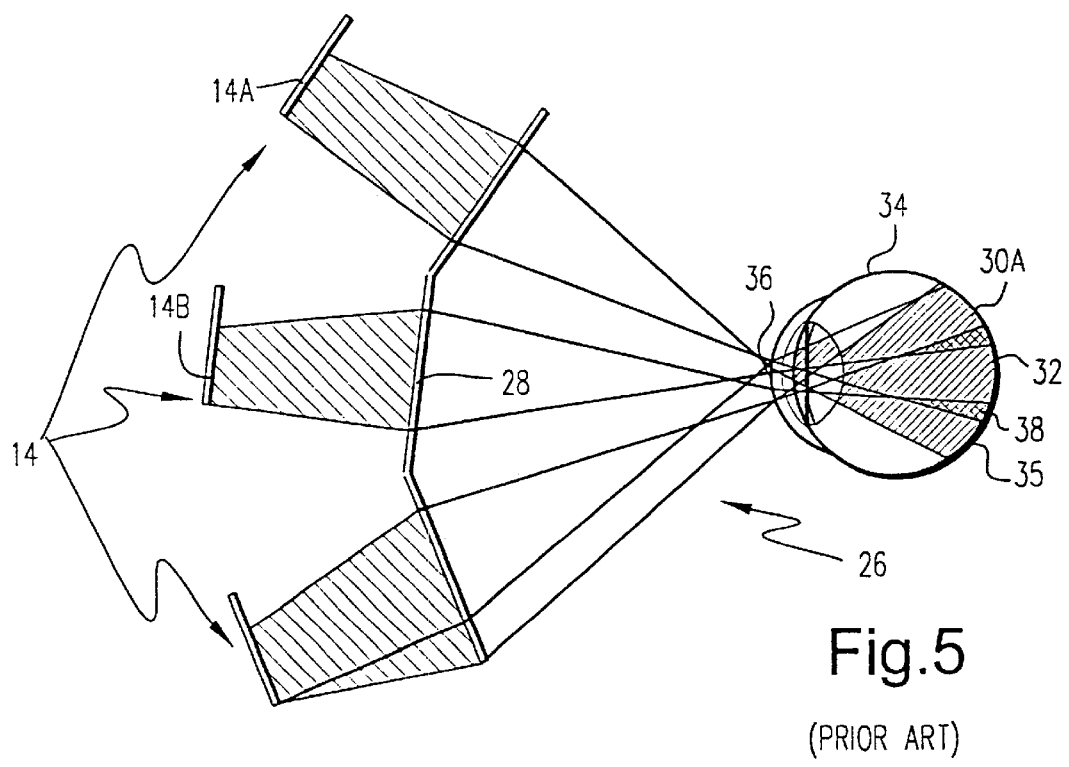
FIG. 5 is a plan view of the schematic ray tracing model of FIG. 4 showing the effects on the retinal image of eye movements in the FIHMD.
Figure 6:
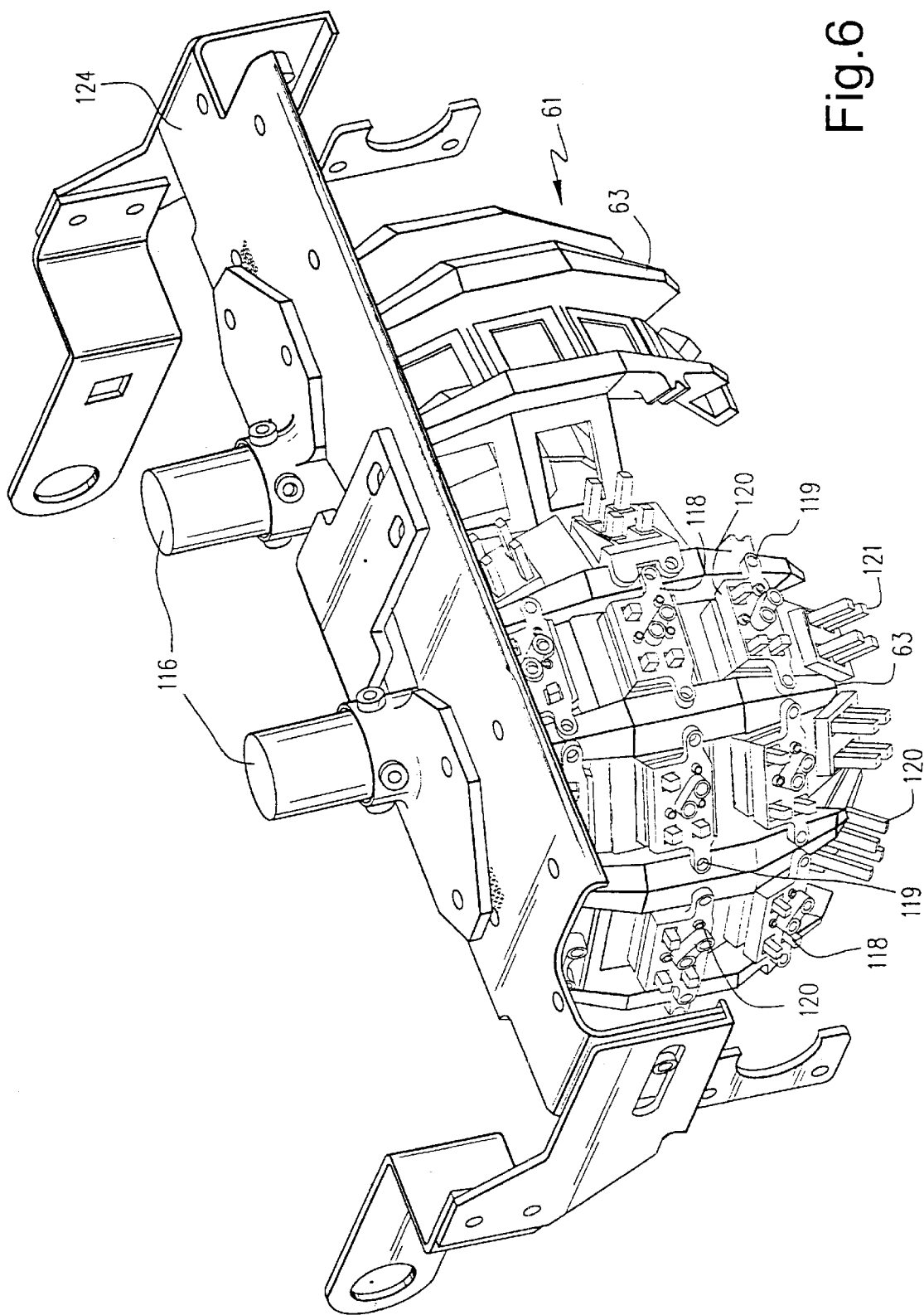
FIG. 6 is a front perspective view of the head mounted display of the present invention.
Figure 7:
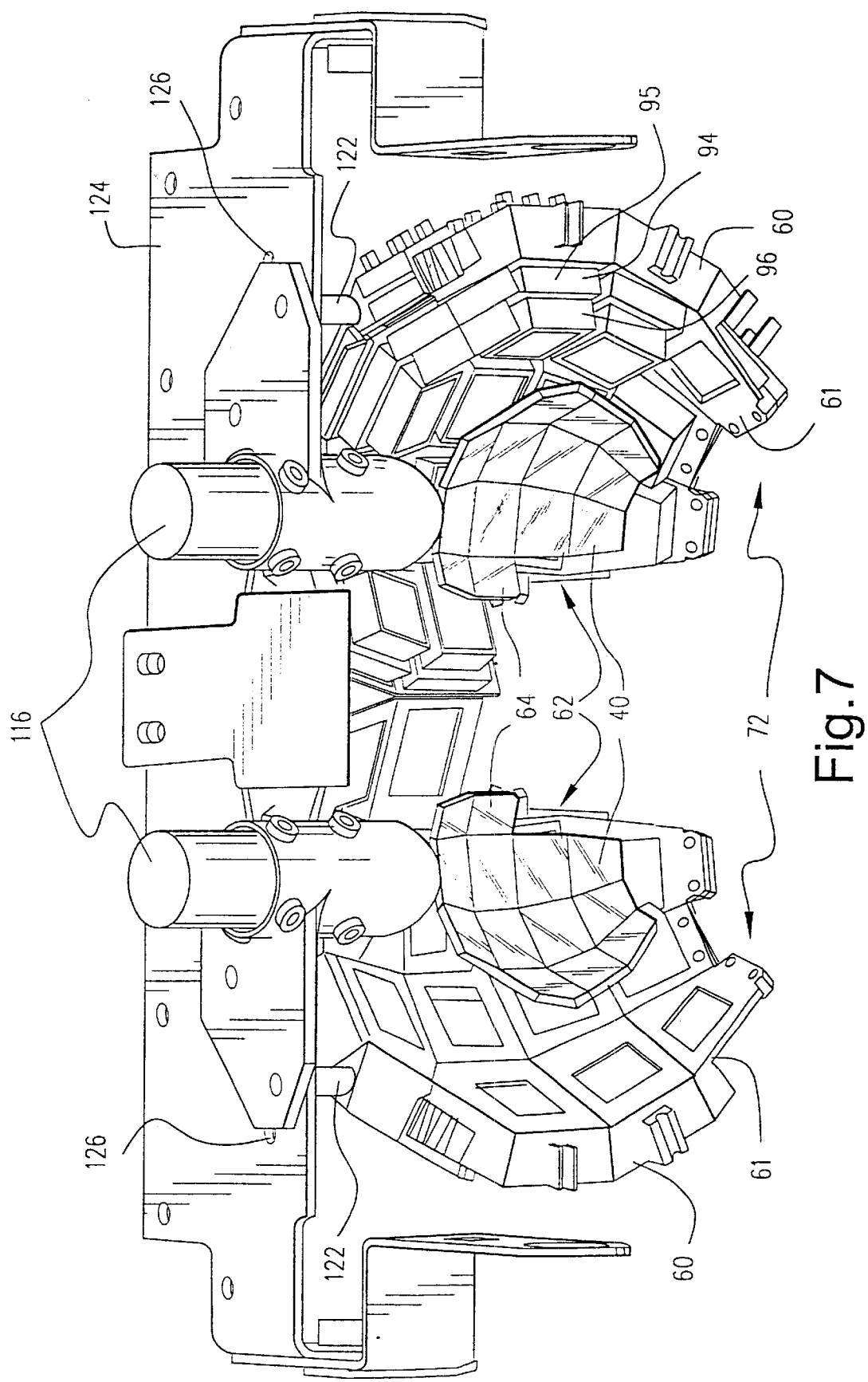
FIG. 7 is a rear perspective view of the head mounted display of the present invention.
Figure 8:
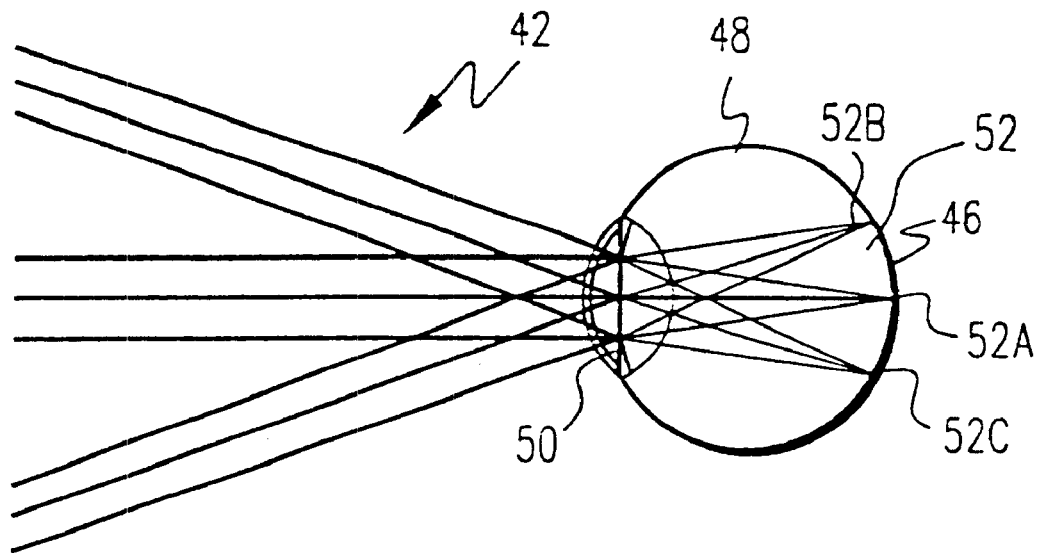
FIG. 8 is a plan view of a ray tracing model for an object to be imaged on the retina of a wide angle schematic eye.

FIGS. 6 and 7 are front and rear perspective views of a preferred embodiment of the head mounted display of the present invention. The present invention preferably uses short focal length (approximately 22 mm), aspheric, Fresnel lenses 40 with a small aperture (<approximately 18 mm diameter), positioned approximately 15 mm anterior to the cornea (not shown) to produce images. Other types of lenses such as conventional glass lenses and plastic optics can also be used. The ray tracing models 42 and 44 of FIGS. 8 and 9 demonstrate the image quality of a Fresnel lens 40 used in the present invention. FIG. 8 shows a ray tracing model 42 for an object (not shown) at 4 meters to be imaged on the retina 46 of wide angle schematic eye 48. The object subtends a visual angle of approximately 40°. This schematic ray tracing model 42 represents the control condition, i.e., there are no optical components in front of the eye 48.

Figure 9:
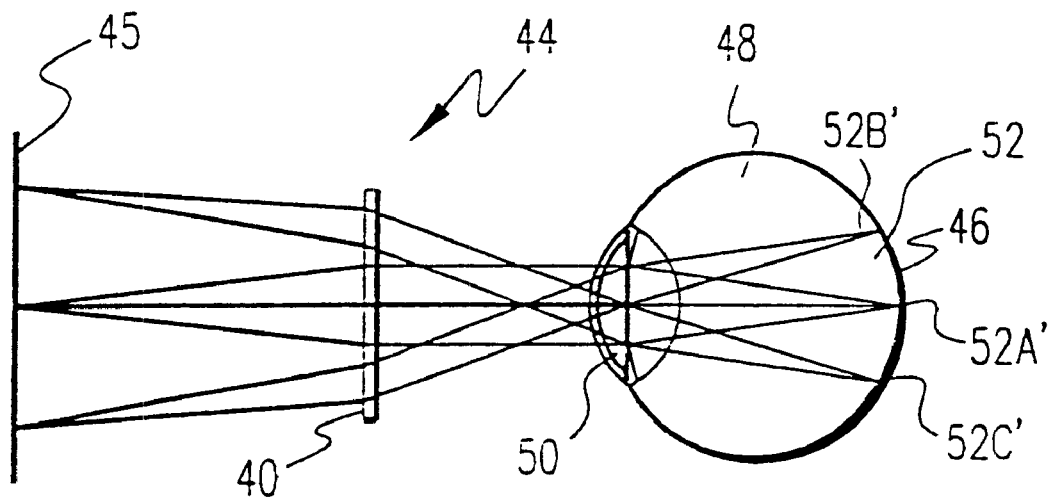
FIG. 9 is a plan view of a ray tracing model for an object to be imaged on the retina of a wide angle schematic eye through a Fresnel lens.

FIG. 9 shows a ray tracing model 44 from an object 45 the size of a typical flat panel display at the focal point of the aspheric Fresnel lens 40. The Fresnel lens 40 is placed approximately 15 mm in front of the eye 48. The schematic eye 48 has a 5 mm diameter pupil 50. The ray tracing model 44 illustrates that there is negligible distortion in the retinal image 52 (relative to the distortion caused by the eye's optics) when viewing through the Fresnel lens 40.

Figure 10:
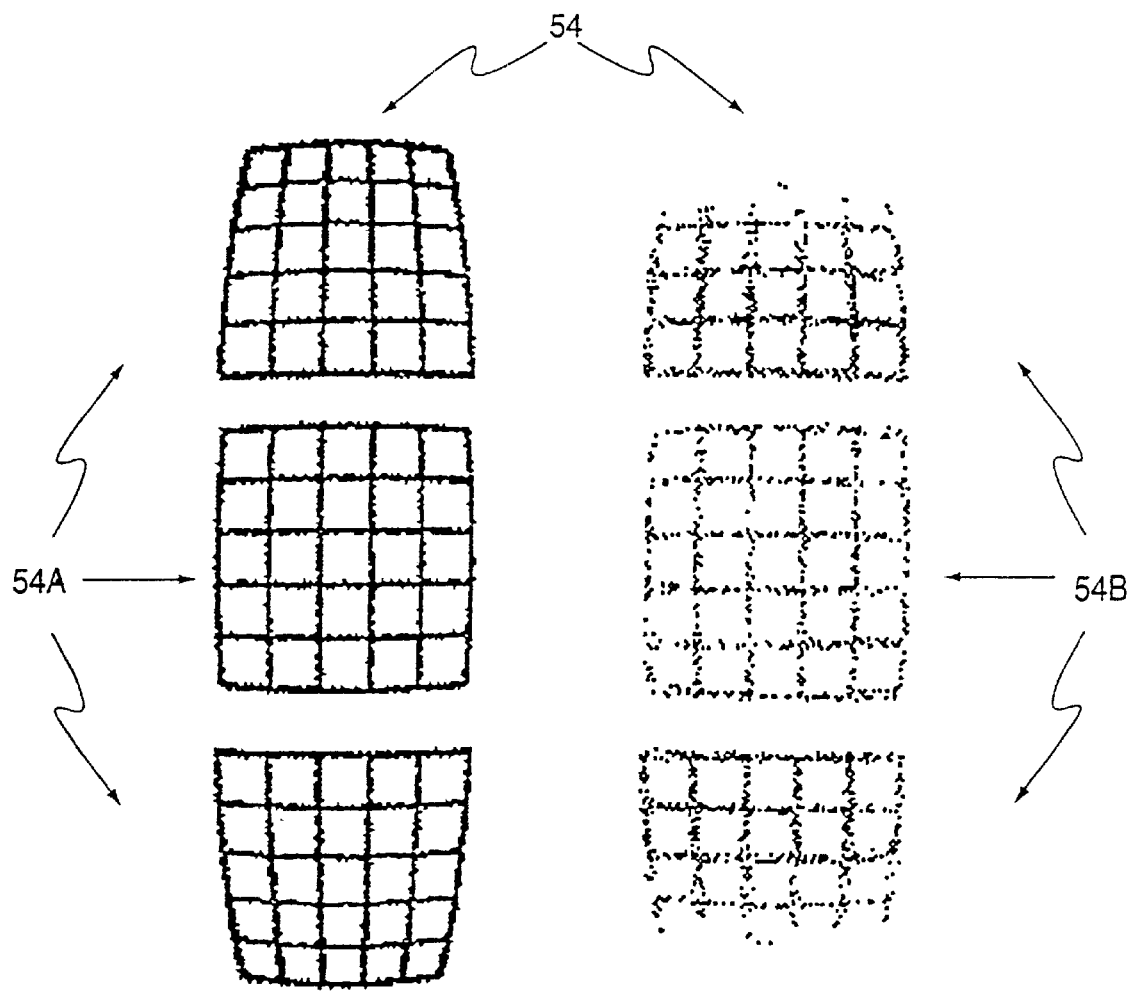
FIG. 10 is a drawing of the retinal images of a rectangular grid formed using the ray tracing models of FIGS. 8 and 9.

FIG. 10 demonstrates the model's representation of the retinal image of a rectangular grid 54 for the center of the image, i.e., central bundles 52A and 52A' in FIGS. 8 and 9, respectively, and for the image margins, i.e., top and bottom bundles 52B and 52C and 52B' and 52C' in FIGS. 8 and 9, respectively. The grids 54A on the left of FIG. 10 are for free viewing an object at 4 meters (FIG. 8) and the grids 54B on the right of FIG. 10 are for viewing the object through the Fresnel lens 40 (FIG. 9). The darker pattern 54A for the free viewing condition indicates that the images are brighter. The fading away of the grid for the marginal images 54B is caused by vignetting at the eye's pupil. The distortion patterns for the two viewing conditions, which illustrate the retinal curvature, are nearly identical (imagine projecting the retinal image onto a tangent plane behind the retina). From the ray tracing model of FIGS. 8 and 9, it can be seen that the field distortions and optical aberrations from Fresnel lens 40 are well within acceptable limits.

Figure 11:
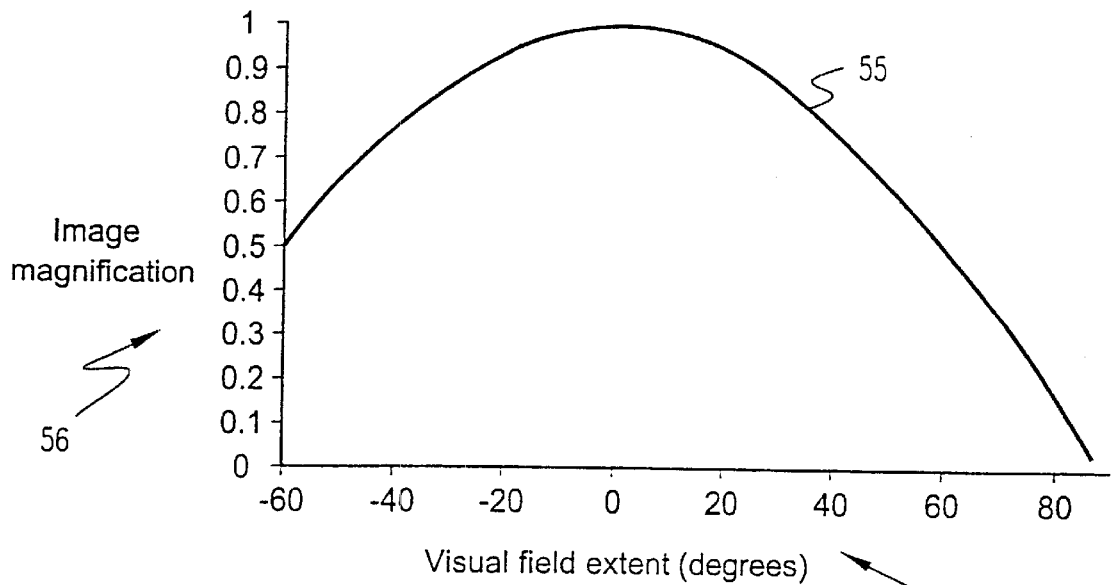
FIG. 11 is a graph showing distortion (image magnification) as a function of the extent of visual field.
Figure 17:
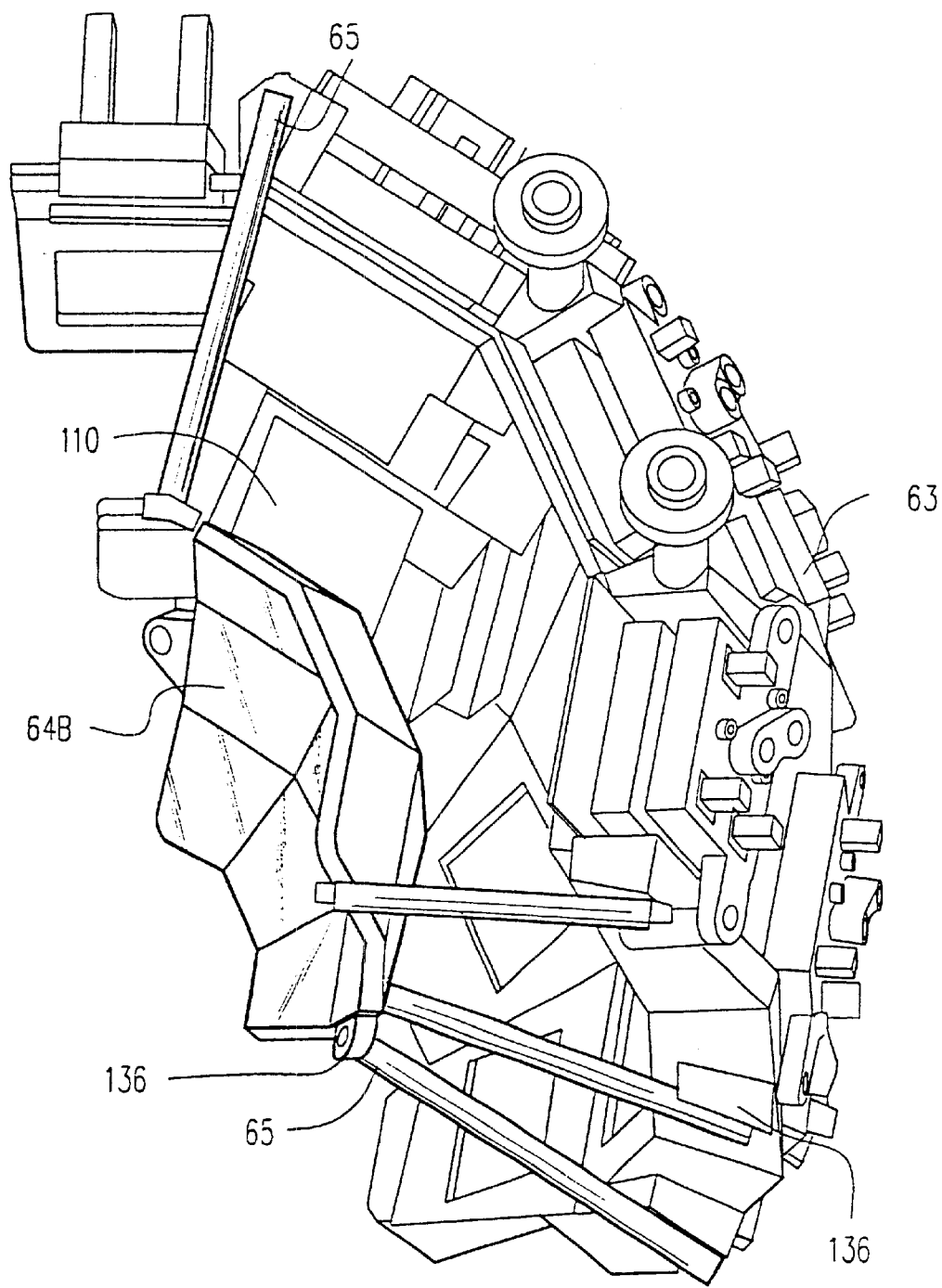
FIG. 17 is a top perspective view of the head mounted display of the present invention.

FIG. 11 is a graph 55, which illustrates image magnification 56 (distortion) as a function of the extent of visual field 58. Image magnification 56 drops to 0.5 (i.e., the image is half its size) at 60°, and continues to rapidly drop with increasing eccentricity. This type of distortion is called "barrel distortion". It occurs in optical systems that use flat surfaces to represent a curved field. To avoid the field distortion problem illustrated in FIG. 11, the Fresnel lenses 40 and video displays 60 used in the present invention are, as shown in FIGS. 6 and 7, configured to be substantially tangent to the surfaces of concentric spheres. The spheres 61 on which the displays 60 are mounted are comprised of a plurality of vertical display support trusses 63, to which the displays 60 are attached. The spheres on which the lenses 40 are mounted are imaginary, and, thus, not illustrated. Nevertheless, the lenses 40 are attached to the display supports by spacing rods 65 (as seen in FIG. 17), such that the Fresnel lenses 40 and displays 60 are positioned to, in effect, form substantially spherical arrays 62 and 72, respectively, that wrap around a user's eyes. Because the displays 60 are rectangular, it is preferable to use trapezoidal lens facets 40, as shown in FIG. 12, to build the spherical array 62 of lenses 40.

Figure 12:
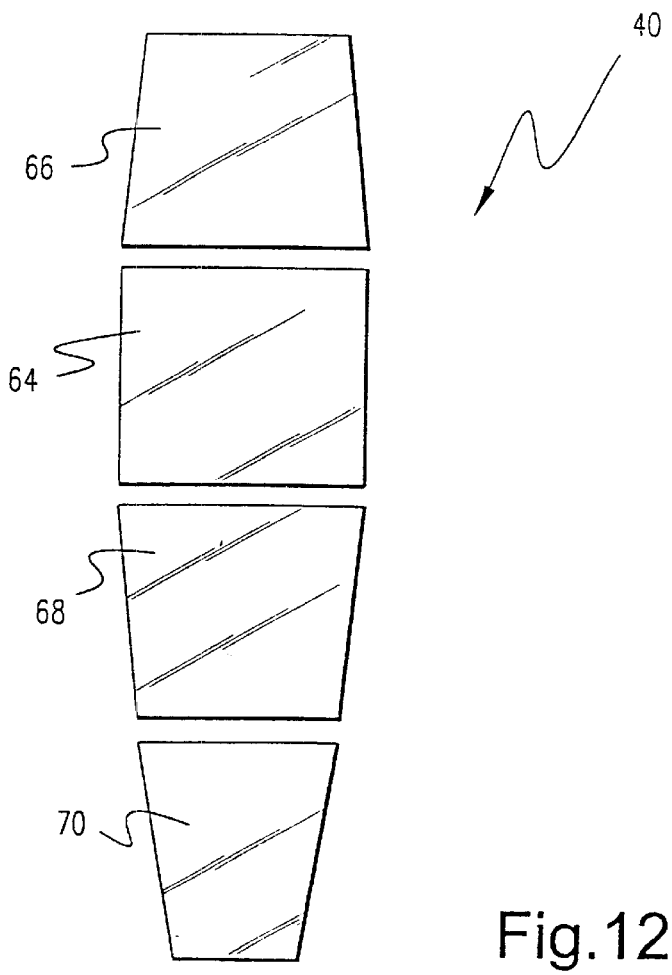
FIG. 12 is a front elevational view showing the shapes of the lens facets for each row in the spherical lens arrays used in the present invention.

FIG. 12 illustrates the rectangular and trapezoidal shapes of the lens facets 40 used for each row in the arrays 62 of the present preferred embodiment. The row 66 immediately above, and the row 68 immediately below, the equator row 64 preferably contain trapezoidal shaped lens facets 40 with a top/bottom ratio of approximately 81%. The most inferior row 70 preferably also contains trapezoidal shaped lens facets 40, but with a top/bottom ratio of approximately 66%, which reflects the convergence of the lines of longitude as they approach the pole of the imaginary sphere to which the lens facets 40 are tangent. Preferably, the facets in each row are the same for every column of the spherical lens array 62.

The video displays 60 used in the present invention are preferably flat panel displays, which are also mounted tangent to the surface of spheres 61 to form spherical arrays 72 of displays. In certain embodiments, the displays 60 for an eye can be mounted on more than one sphere, such that the lens array 62 is comprised of lenses with different focal lengths, and each display 60 is mounted at the focal length of its corresponding lens. In a preferred arrangement, the radii of the two spheres 61 for two arrays 72 of displays are longer than the radii of the imaginary spheres for the arrays 62 of lenses 40 preferably by an amount equal to the focal length of the lenses 40. That is, the displays 60 are preferably mounted at the focal point of the corresponding Fresnel lenses 40, on axis with the lenses, so that each lens 40 images its corresponding display 60 at optical infinity. Because the imaginary spheres to which the lenses 40 are tangent, and the corresponding spheres 61 to which the displays 60 are tangent have the same center, the radial line passing through the center of each lens 40 also passes through the center of its corresponding display 60. In certain arrangements, one or more displays 60 can be mounted at a position other than the focal length of its corresponding lens. For example, the display can be movably positioned relative the lens, where a change in position simply changes the focus of the displayed image. The displays 60 can be mounted on movable pistons so that each display can be moved back and forth relative its lens.

Figure 13:
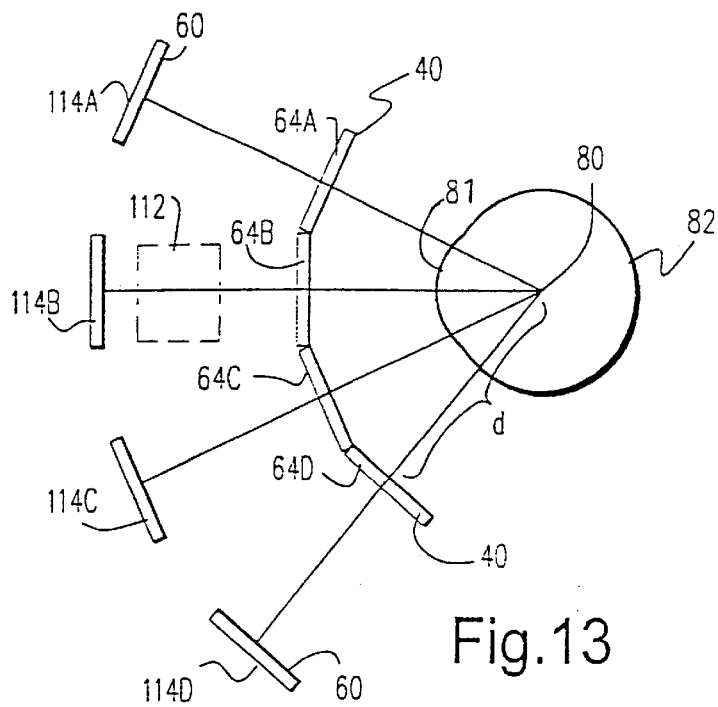
FIG. 13 is a plan view schematic of the optical configuration for the head mounted display of the present invention.

FIG. 13 is a plan view of a schematic of the optical configuration for the head mount display of the present invention. As can be seen from FIG. 13, the center 80 of the spheres to which the lenses 40 and displays 60 are tangentially mounted are substantially coincident with the center 80 of rotation of the eye 82. By referencing to the eye's rotation center 80, misalignment with the optical system is prevented when a viewer moves his or her eyes 82. The facet 64B that is viewed when the user stares straight ahead is defined as the central facet. As illustrated in FIG. 13, changing the direction of gaze to another facet does not alter the geometry of the optics relative to the eye 82.

Because the lens facets 40 and displays 60 are each tangent to a sphere centered on the center of rotation 80 of the eye 82, as the observer looks around, the optical configuration relative to the eye 82 does not change. For example, if the observer shifts his gaze to the nasal-most display 64A, that display now becomes the center (with no vignetting). The center display 64B becomes the first temporal display, with about 20% vignetting. The first temporal display 64C becomes the far temporal display, with about 50% vignetting. The far temporal display 64D goes out of the field of view. In short, the optical configuration of the HMD of the present invention (relative to the retina) is independent of eye orientation.

In another embodiment of the present invention, the center of the tangent hemisphere could be positioned closer to the center of rotation of the eye than to the front surface of the cornea.

The variable parameters of the optical system of the present invention are preferably: 1) radius of the sphere on which the lenses 40 forming the lens array 62 are substantially tangentially mounted (which determines the distance of the lens facet from the eye), 2) the dimensions of the video displays 60, 3) the aperture size of the equatorial lens facets 64, and 4) the focal length of the lenses 40. Preferably, a 40° horizontal×30° vertical field of view is used for the equatorial facets 64. Because the visual resolution of the displays varies inversely with the focal length of the lenses 40, a focal length that would match the magnification of the displays 60 to the angular subtense of the equatorial lens facets 64 is preferable. Each lens facet can be thought of as a window (i.e., field stop) through which the magnified image of a corresponding display is viewed. If a lens facet 40 is too large, one will see past the edges of the corresponding display 60 and gaps will appear between neighboring displays 60. If a lens facet 40 is too small relative to the magnified image of the corresponding display 60, the display image will overfill the facet 40. This is not a negative result, but the pixels will have been magnified more than necessary, thereby reducing visual resolution.

The specifications for two miniature displays that can be used in the invention, i.e., an emissive display from Micron and an emissive display from Planar (MICROBRITE AMEL) are provided in the table below. Also listed is an emissive display from eMagin and a reflective LCD display, which can be used in the presently described arrangement or in alternate arrangements of the invention.

| Display | Color | Resolution | Active area |
| --- | --- | --- | --- |
| Micron | Pattern | 274 × 222 | 11.2 mm × 8.4 mm |
| Planar | Sequential | 640 × 480 | 15.5 mm × 11.4 mm |
| eMagin | Pattern | 800 × 600 | 12 mm × 9 mm |
| MicroVue | (Reflective LCD) | 1280 × 1024 | 17.4 mm × 14 mm |

Figure 14:
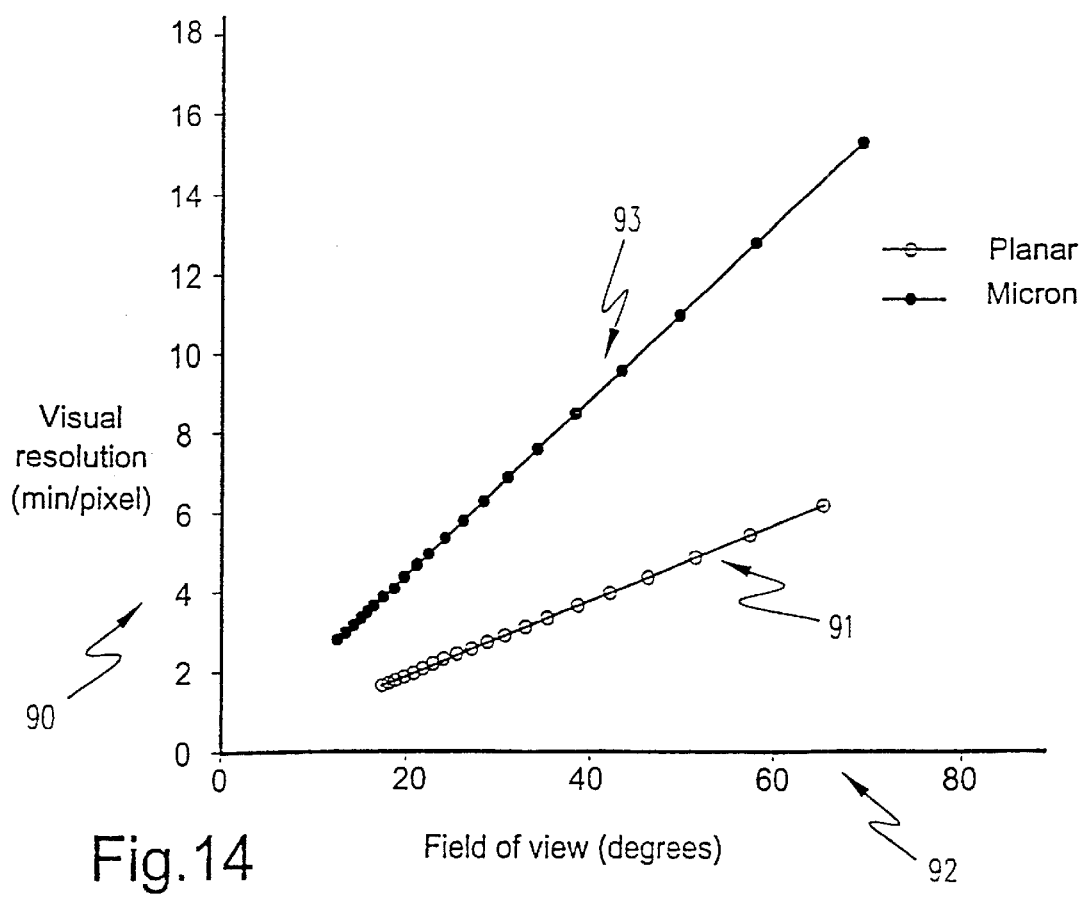
FIG. 14 illustrates the relationship between visual resolution and field of view for the video displays of the present invention, as the focal length of the Fresnel lenses is changed.

To achieve the preferred 40°×30° field of view for the equatorial facets 64, given the active areas of the displays 60, the focal length of the Fresnel lenses 40 are 15.5 mm for the Micron display and 21.3 mm for the Planar display. However, resolutions at that field size are very different for the two displays. FIG. 14 illustrates the trade-off between visual resolution 90 and field of view 92 for each display, as the focal length of the Fresnel lenses 40 is changed. Shown in FIG. 14 are the visual resolution versus field of view graphs 91 and 93 for the Planar and Micron displays, respectively. Although the Planar display is preferable in achieving system resolution and field of view requirements, it has other performance limitations that make it less than ideal.

The Planar display uses temporal dithering (i.e., pulse count modulation) to achieve gray shades. The phosphor, which has a 220 µsec decay time, is illuminated with a burst of pulses. To change gray level, the pulse density is changed. At a 60 Hz frame rate, 5 bit gray level resolution can be achieved.

Field sequential color is accomplished preferably with two liquid crystal color shutters (LCCS) 94 combined with spectral notch filters 95, as shown in FIG. 7. One LCCS is preferably a red/green polarizer and the other is preferably a blue/yellow polarizer. The yellow side of the blue/yellow polarizer transmits red and green light in addition to yellow and the green side of the red/green polarizer transmits blue light in addition to green. To obtain the red primary, the red/green shutter is in the transmit red state (relaxed state) and the blue/yellow shutter is in the transmit yellow state (relaxed state). For the green primary, the red/green shutter is in the transmit green state (active state) and the blue/yellow shutter is in the transmit yellow state (relaxed state). For the blue primary, the red/green shutter is in the transmit green state (active state) and the blue/yellow shutter is in the transmit blue state (active state). The activation time for each shutter is preferably 50 µsec and the relaxation time is preferably 1.7 ms. Consequently, it takes approximately 50 µsec to switch from the red to green primary and from the green to blue primary, but, it takes approximately 1.7 msec to switch from the blue to the red primary. The red primary has a maximum luminance of 14 cd/m$^2$, the maximum luminance for the green primary is 41 cd/m$^2$, and the maximum luminance for the blue primary is 7 cd/m$^2$.

All three color fields must be exposed within approximately 16.7 msec to achieve the preferable color frame rate of 60 Hz. Rates slower than 60 Hz produce color flashes and smearing with eye movements. If luminance and color switching time were not an issue, then each color field could be exposed for approximately 5.6 msec, enough time for 11 17 1 pulses (i.e., between 3 and 4 bits gray level resolution per color). Also, the green primary is 3 times more luminous than the red primary and 6 times more luminous than the blue primary. Furthermore, because of the slow relaxation time of the LCCS 94, 30% of the 5.6 msec interval for the red primary is consumed with color switching. Thus, there would only be enough useable time for 8 pulses for the red primary (3 bit gray level resolution) if the intervals were equally distributed among the three primaries. To solve these problems, the intervals must be made unequal, which means different primaries have different numbers of gray levels.

Figure 15:
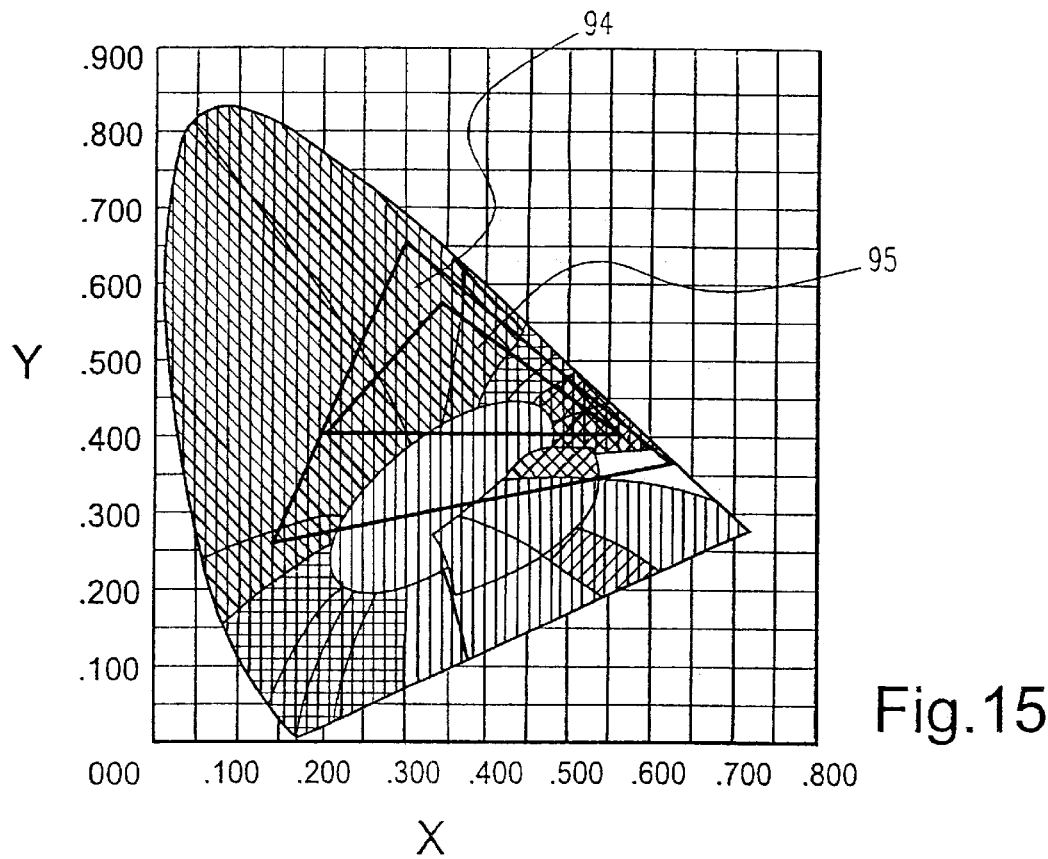
FIG. 15 is a graph showing the color gamut of the Planar display of the present invention with LCCS and pattern color.

The blue primary is quite desaturated (x=. 153, y=.287) and the red primary is in the orange (x=.62, y=.365). The color gamut 94 (larger triangle) shown in FIG. 15 is biased toward the green (x=.302, y=.665). Although the color gamut is larger than the gamut 95 for Planar's pattern color display (small triangle) shown in FIG. 15, it is more restricted than that for most LCD and CRT displays. To render white (x=.33, y=.33), the green primary must be turned off.

The Planar display has a pixel pitch of 24 µm. The color gamut 94 could be improved by changing to a phosphor with a flatter emission spectrum (the current "white" phosphor has a strong peak in the green), or a mixture of phosphors that would provide a shorter wavelength blue primary.

The Planar display has an active area of 15.5 mm×11.4 mm. The total dimensions of the display substrate plus LCCS 94 is 25.7 mm×23.4 mm. Because of the taper on the superior and inferior trapezoidal facets 66, 68 and 70, the displays 60 would have to be mounted tangent to a 52 mm radius sphere to avoid physically overlapping each other. Even with this radius, the Planar displays would not fit in the most inferior row 70 (e.g., 48° inferior in FIG. 12). To fit inferior row 70, the radius of the sphere would have to be approximately 80 mm. An 80 mm radius sphere centered at the center of rotation of the eye would require a minimum interpupillary distance of 97 mm to prevent the nasal displays from colliding with one another. This distance is outside the range of human dimensions. A 52 mm radius sphere centered at the center of rotation of the eye would require a minimum interpupillary distance of 57 mm, which based on anthropometric measurements, is one standard deviation less than the mean adult interpupillary distance.

The Micron displays fit the most inferior row 70 of facets for a 52 mm radius sphere. Since the Micron pixel pitch is 41 µm, compared to 24 µm for the Planar display, there is only a 1.7 times increase in the visual angle per pixel for the most inferior displays 61, where the Micron displays are used with the most inferior row of facets 70. Thus, the visual resolution for the Planar displays is 4 min/pixel. And for the most inferior facets being used with the Micron displays, the visual resolution is 6.8 min/pixel. This difference is not be noticeable in the inferior field. As such, the Planar displays are mounted tangent to a sphere having a radius preferably of 52 mm, and Micron displays are preferably used for the most inferior row of facets 70.

It should be noted that the timing of the color switching of the LCCS 94 does not allow enough time for the LCCS 94 to relax to the red state when operated with the Planar displays. To achieve optimal color rendering with the Planar displays, the period of the red primary should be lengthened and the onset of the pulse burst to the display delayed for approximately 1.7 msec (when the polarizers are in the full red and full yellow relaxed states). Preferably, the period of the blue primary should also be extended to increase its luminance. These modifications will, however, affect the exposure period of the green primary, which needs to be reduced in luminance, and the gray scale for the green primary, which is effectively reduced to one bit. The result of better looking color rendering is offset by an unacceptably low number of color levels. This is a limit of the Planar display that cannot be overcome without a significant reduction in the frame rate (e.g., to 30 Hz). However, reducing the frame rate increases the risk of color-flash artifacts whenever a saccadic eye movement is made.

Another type of emissive display which can be used with the present invention is known as an organic light emitting display (OLED) which produces pattern color (e.g. red, green, and blue without requiring a color filter). To achieve a 22.6°×14.25° field of view, the focal length of the Fresnel lenses would be 17 mm. Such displays can be used in the present invention to achieve a resolution of 800×600. In different optical arrangements of the present invention, OLED displays can be incorporated into a head mounted display wherein the displays 60 are OLED displays and the color shutters 94 and spectral notch filters 95 are eliminated from the design.

A further type of display, which is an alternative to the emissive displays, is a reflective liquid crystal display (LCD), such as one available from MicroVue. This display uses an LCD made of silicon, which can provide high color pixel resolution, an excellent color gamut with 24-bit color, and satisfactory display dimensions for the present invention's optical design requirements. The use of reflective LCD displays requires a different optical geometry and an external light source, and thus the optical components are arranged in a different manner, as described below with reference to FIG. 26.

In order to produce a satisfactory field of view in the HMD, several factors must be balanced, including choosing an appropriate focal length of the lenses 40 to allow for image overlap. By providing overlapped images, the appearance of seams between the display images is minimized and the HMD achieves the best possible visual resolution. Since the displays 60 are preferably imaged at optical infinity, the angular size of the images of the displays 60 (and pixels) on the retina is approximately inversely proportional to the focal length of the Fresnel lens 40. Also, enough room between the displays and the Fresnel lenses is preferably left to insert a beam splitter 112 (shown in outline form in FIG. 13) for eye tracking cameras 116.

The provision of overlap can overcome limitations in the geometry of the system and of the displays themselves. It is desirable to fill the field of view through the lens facets with display images. However, one problem with commercially available displays is that each display includes a non-display border region which surrounds the display area. Such a border region appears in the displayed images when the user rotates his eyes. This border problem is minimized by using a piece of flat glass (discussed below with reference to glass plates 96) which moves the virtual image of the display closer to the lens. This allows for the use of lens panels with smaller apertures, and hence a frame with smaller angles. The smaller apertures translate directly to increased image overlap. An overlap of as little as 1 to 5 degrees or more is desirable. However, within the geometrical constraints of the system, it is preferable to provide for at least 5 degrees of overlap, and more preferably approximately 10 to 15 degrees of overlap between the displayed images. Such overlap effectively hides the border region of the displays so the user views a seamless montage of displayed images when rotating his eyes.

Another consideration in achieving image overlap is the physical size of the lens aperture. As illustrated in FIG. 13, the dimensions of the lens facets 40 are preferably proportional to the distance "d" of any of the lenses 40 from the center of rotation 80 of the eye 82. The lenses 40 cannot be closer to the eye than approximately 13 mm, the standard eye relief of spectacle lenses. The largest aperture for different focal length Fresnel lenses 40 that produces an acceptable image (i.e., no perceptible distortion) was approximately f/1.4 (where the notation f/1.4 refers to aperture size).

In the preferred embodiment, a focal length of approximately 22 mm is used for the Fresnel lenses 40, which gives an image of the display that is approximately 39° wide, a visual resolution of approximately 3.6 min/pixel, a cornea to lens relief of approximately 15 mm, and a lens aperture of approximately f/1.5. Given the geometry of the system, the displays 60 are preferably physically located approximately 27 mm from their corresponding lenses 40, not 22 mm (which would require the eye 82 to view a virtual image of the display 60 at 12 cm). A 27 mm focal length lens results in a 3 min/pixel visual resolution, but a 32° wide image of the display on the retina (6° too small for display image overlap). If the 22 mm focal length lens is moved to a radial distance of approximately 30 mm, so that it would be approximately 22 mm from the display, then the lens aperture would have to be approximately f/0.78.

This geometry problem is preferably solved by cementing thick glass plates 96 to the color shutters 94, which are mounted on the displays 60 as shown in FIG. 7. From refraction at the glass/air interface, a virtual image of the display is created approximately 5 mm forward of the actual plane of the display, so that the displayed image is magnified. This modification allows the display to be imaged at optical infinity with the 22 mm focal length lens using an acceptable lens aperture and working within the physical constraints imposed by available displays.

Figure 16:
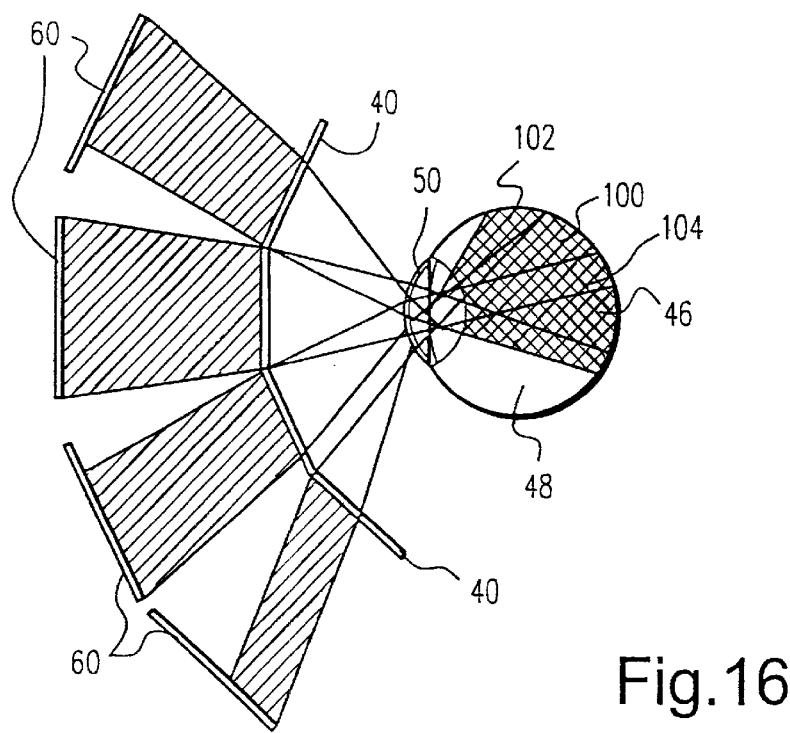
FIG. 16 is a planar view of a ray tracing model of equatorial displays and optics in the HMD of the present invention.

FIG. 16 is a plan view of a ray tracing model for the HMD of the present invention. For the preferred embodiment of the invention, the flat panel displays 60 have horizontal dimensions of approximately 19 mm; the focal lengths of the aspheric Fresnel lenses 40 are approximately 22.5 mm; the horizontal lens width is approximately 12.6 mm; the distance from the lens 40 to the cornea is approximately 15 mm; and the angle between lens facets 40 (referenced to the center of the tangent sphere) is approximately 25°. The cross-hatched areas 100 in FIG. 16 represent the bundle of rays from the displays 60 along the equator that are imaged on the retina 46 (top down view for the left eye). The wedge 102, which does not extend to the retina 46, is an unilluminated area between the marginal rays for two adjacent display images. For this configuration, the montage of display images 104 on the retina 46 is seamless and extends to approximately 85° temporal field (for the display at the bottom of the figure) and 50° nasal field (for the display at the top of the figure). Thus, the entire field of view for the eye is illuminated with uninterrupted images of displays.

Figure 26:
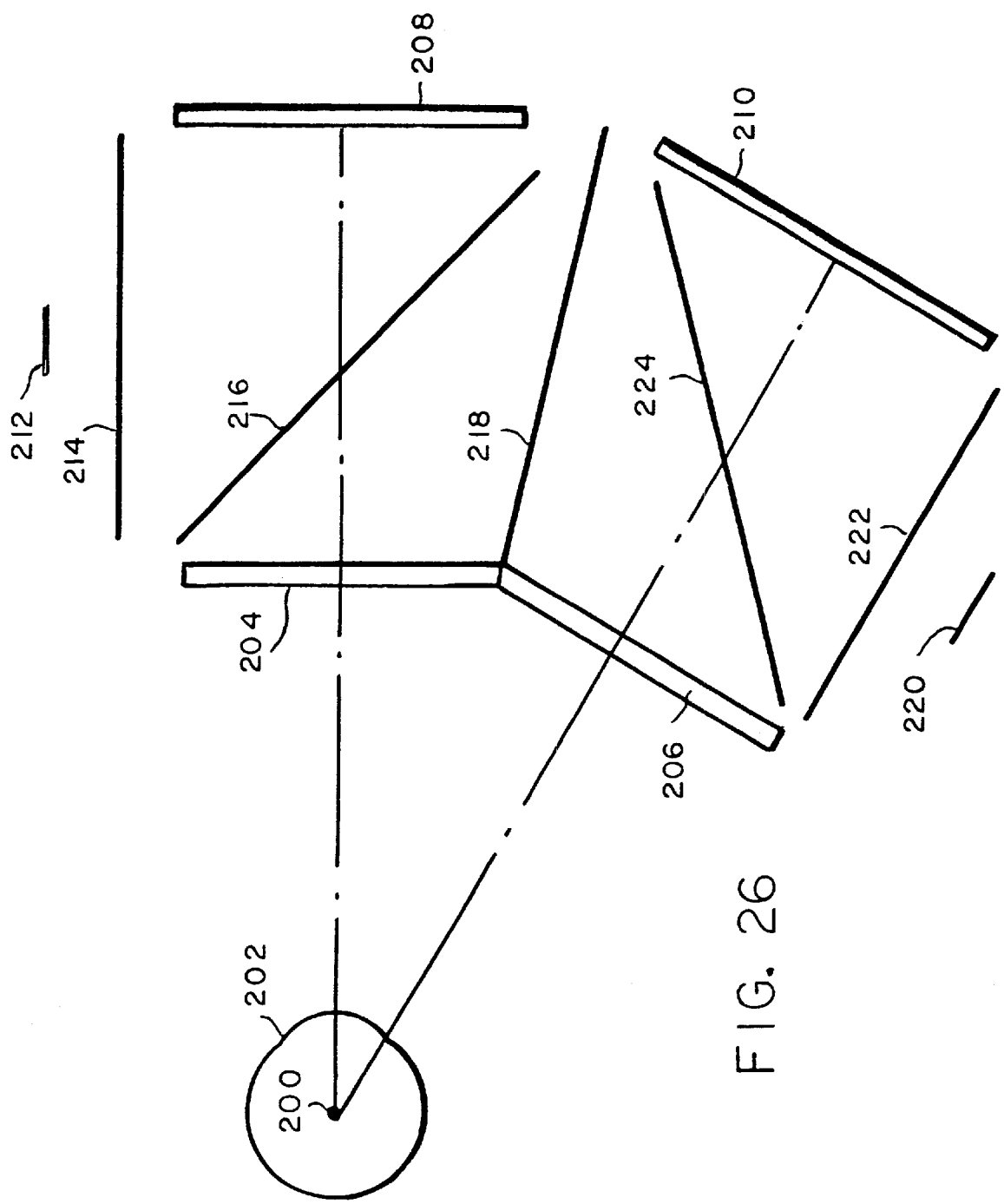
FIG. 26 is a plan view schematic of an alternate optical configuration for the head mounted display of the present invention.

FIG. 26 illustrates an alternate arrangement of the head mounted display of the present invention having two rows of lenses/displays. This design is a preferred arrangement for use with reflective LCD displays, which require additional optical components to be located adjacent each display. In the multi-panel display of the present invention, there is very little room between a given lens panel and its respective display. Thus, it is very difficult to fit the required optical components needed to illuminate the front surface of a reflective display and still allow for multiple panels.

By providing a head mounted display with two rows of displays, the additional optical components can be placed above the top row and below the bottom row of the HMD. As shown in FIG. 26, a top row 204 of lenses and a bottom row 206 of lenses are mounted tangent to a first sphere substantially coincident with the center of rotation 200 of the eye 202. A plurality of reflective displays 208 and 210 are mounted tangent to a second sphere located radially outside of the first sphere at the focal point of the lenses 204 and 206, respectively. For the top row 204 of lenses, a beam splitter 216 is arranged at a 45 degree angle relative to the optic axis in front of the row of reflective displays 208. A light source 212, e.g. an LED point source, is positioned above the top row so that it irradiates light toward a holographic diffusing material 214, which filters any impurities and directs light toward the beam splitter 216. The beam splitter allows 50% of the light to pass through and focuses the remaining 50% of the light toward the displays 208, allowing display images to be viewed through the lens array 204. Accordingly, for the top row of lenses/displays, the light source 212 and diffuser 214 are positioned above the beam splitter 216 and out of the field of view visible through the lens array 204.

For the bottom row 206 of lenses, a beam splitter 224 is arranged between the lens array 206 and the row of displays 210 at a 45 degree angle relative the optic axis. A light source 220 positioned below the bottom row directs light toward a diffuser 222 and the beam splitter 224, so that a display image can be viewed through the lens array 206. A light baffle 218 is arranged between the top and bottom rows in order to block light from passing therethough. For the bottom row of lenses/displays, the light source 220 and diffuser 222 are positioned below the beam splitter 224 so as to be out of the field of view visible through the lens array 206.

A preferred type of reflective LCD displays is manufactured by MicroVue and has a resolution of 1280×1024, with an active area of 17.4 mm×14 mm. The displays are positioned at a focal length of approximately 21 mm from the lens arrays to achieve a field of view of 43°×34°.

The present invention preferably also includes eye trackers. Because the eye is positioned within the field of the central 40°×30° display, the eye trackers measure eye position within that range.

FIGS. 6, 7, 13, 17 and 2 show the locations (see FIGS. 13 and 17) of the various components comprising eye tracker system 110 used in the preferred embodiment of the present invention. These components include a conventional beam splitter 112 (shown in outline form in FIG. 13) that transmits about 95% of the light and reflects about 5%. The beam splitter 112 is preferably positioned in front of a central display 114B, between a central lens 64B and a display 114B. Each beam splitter 112 is preferably tilted back approximately 42°.

A charge coupled device (CCD) video camera 116 (FIGS. 6 and 7), with extended infrared sensitivity, is mounted preferably above each beam splitter 112 and out of view through any of the lens facets 40. The entrance pupil 81 of the eye 82 is about 18 mm from the 22 mm focal length Fresnel lens 64B. Thus, the Fresnel lens 40 forms a virtual image of the pupil 9.9 cm away from the lens 64B (behind the entrance pupil) that is magnified by a factor of 5.5. The lens on each of the video cameras 116 is focused for an object distance of 9.9 cm, plus the distance from the camera 116 to the beam splitter 112, plus the distance from the beam splitter 112 to the Fresnel lens 64B. Thus, the lens on the camera 116, in combination with the central Fresnel lens 64B, images the pupil 81 on the CCD 116. The eye 82 is preferably illuminated with an infrared light emitting diode (not shown) mounted below the nasal lens facet 64A. A filter (not shown) that transmits IR and blocks visible light is preferably placed in front of each of the CCDs 116. Consequently, the pupil 81 is imaged in infrared light and no light from the displays 60 (which would pass up through the beam splitter 112) reach the camera's CCD detector array.

The focal plane of each of the cameras 116 is adjusted so that the pupil 81 is substantially centered, and in focus, when the centers of the concentric faceted spheres 40 are at the center of rotation of the eye, and the pupil 81 is substantially centered on the optic axis of the central lens facet 64B. Therefore, in addition to eye tracking, the cameras 116 are used to properly align the viewer within the system. A live video image of the pupil is displayed on a monitor (not shown). Preferably, there is a beam splitter 112 and downward-looking CCD video camera 116 for each eye.

Figure 18:
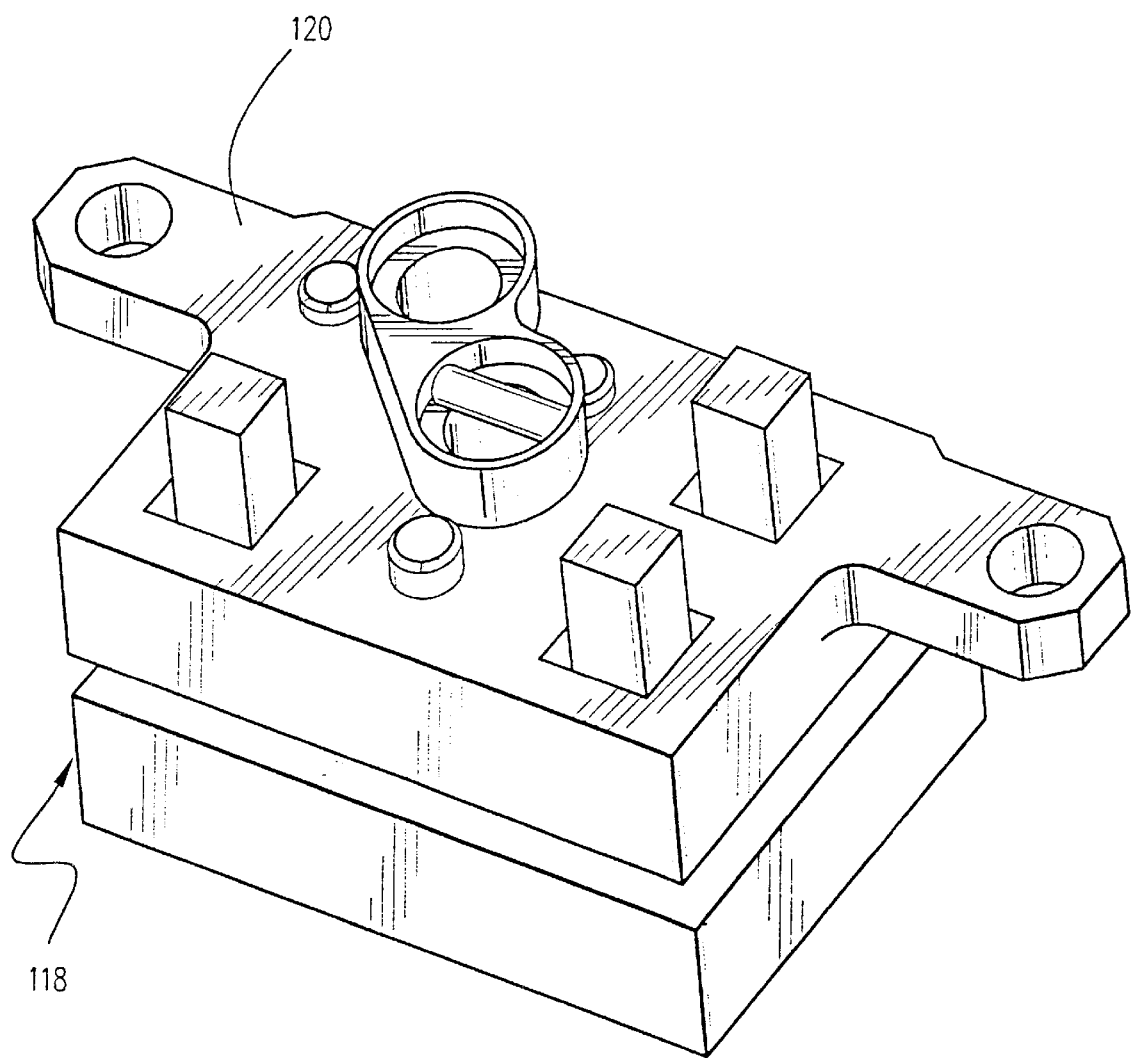
FIG. 18 is a perspective view of a display mount.

The display mounts 118, as shown in FIGS. 6 and 18, allow the rotation, translation, and tilting of each of the displays 60 to align each display with an adjacent lens 40 (final image alignment is accomplished in the computer), and to make the display surfaces normal to the optic axis. Screw slots 119 allow coarse alignment, and a 3-point spring-loaded positioner 120 enables the making of fine adjustments. The Planar and Micron displays 60 are preferably bonded to the display mount 118. Heat vanes 121 allow for the dissipation of heat from the display 60. The Display support spheres 61 comprised of vertical support trusses 63 support and separate the columns of displays 60. These trusses 63 support the display mounts 118 and are mounted on the outside of the display support spheres 61.

The display support spheres 61 are attached to a frame 124, which suspends the entire display system (lens array plus display array). Two rods 122 extending vertically from the display support spheres 61 are attached to the frame 124 through slots 126. The slots are designed to produce translations of the display spheres for interpupillary distances (IPD) of 57 mm or greater and translation plus rotation of the display spheres for IPDs preferably less than 57 mm.

Figure 19A:
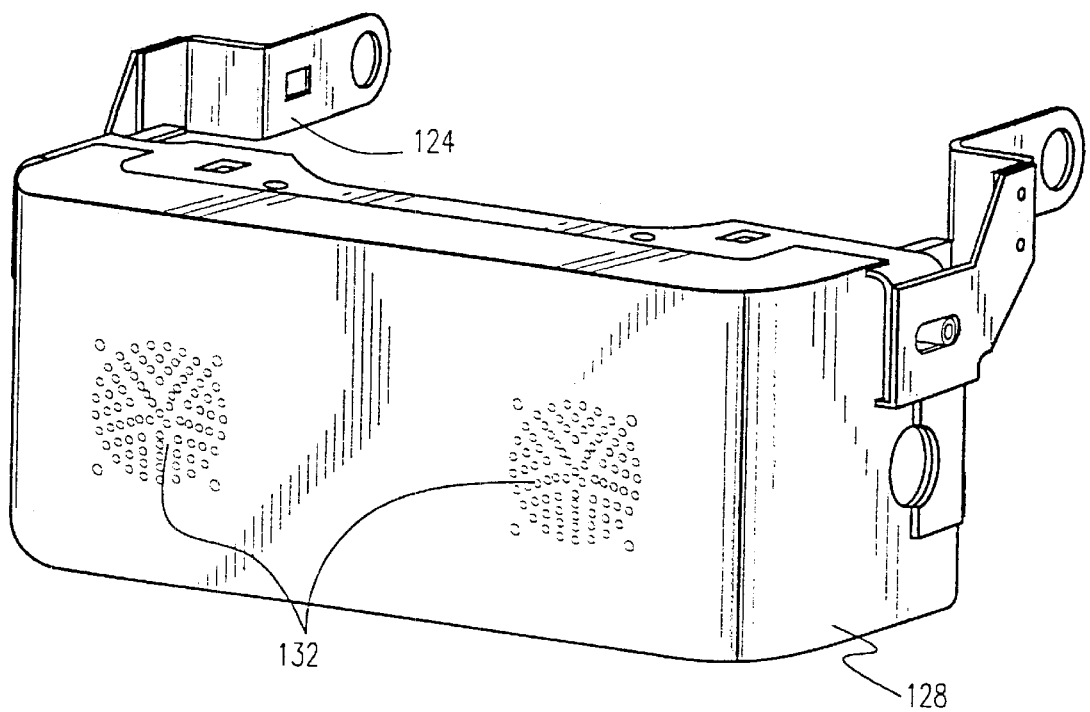
FIG. 19(a) is a front perspective view of the display system cover.
Figure 19B:
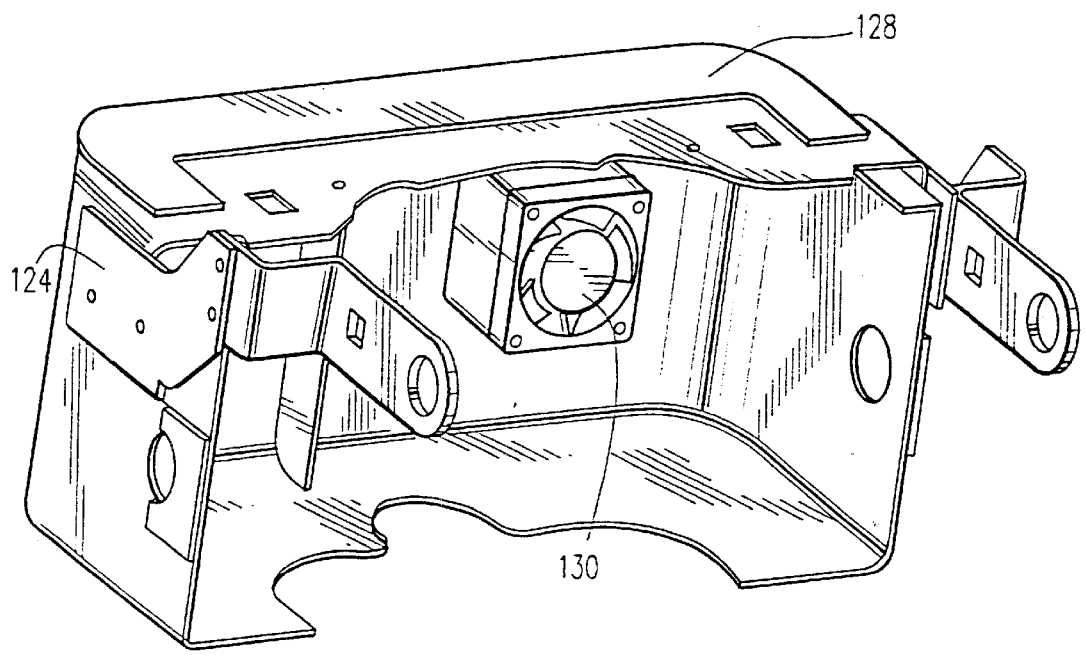
FIG. 19(b) is a rear perspective of the display system cover.

As shown in FIGS. 19a and 19b, the suspension frame 124 preferably mounts within a cover 128, which encloses the display spheres 72. The cover 128 contains a small fan 130 and ventilation holes 132 for each display support sphere 72. The fans 130 are shock-mounted to prevent the transmission of vibrations to the display system or to the user's head. The fans 130, which cool the entire system, are mounted adjacent to the ventilation holes 132.

The molded lens arrays 62 and the molded display support spheres 61 each have tabs 136 into which lens array support rods 65 are inserted. With the rods 65 in place, the lens arrays 62 can then be properly positioned to be concentric with the respective display support spheres 61, with the lens facets on axis with the corresponding display facet, and with each lens facet positioned at the correct orientation and distance from its display.

Figure 20:
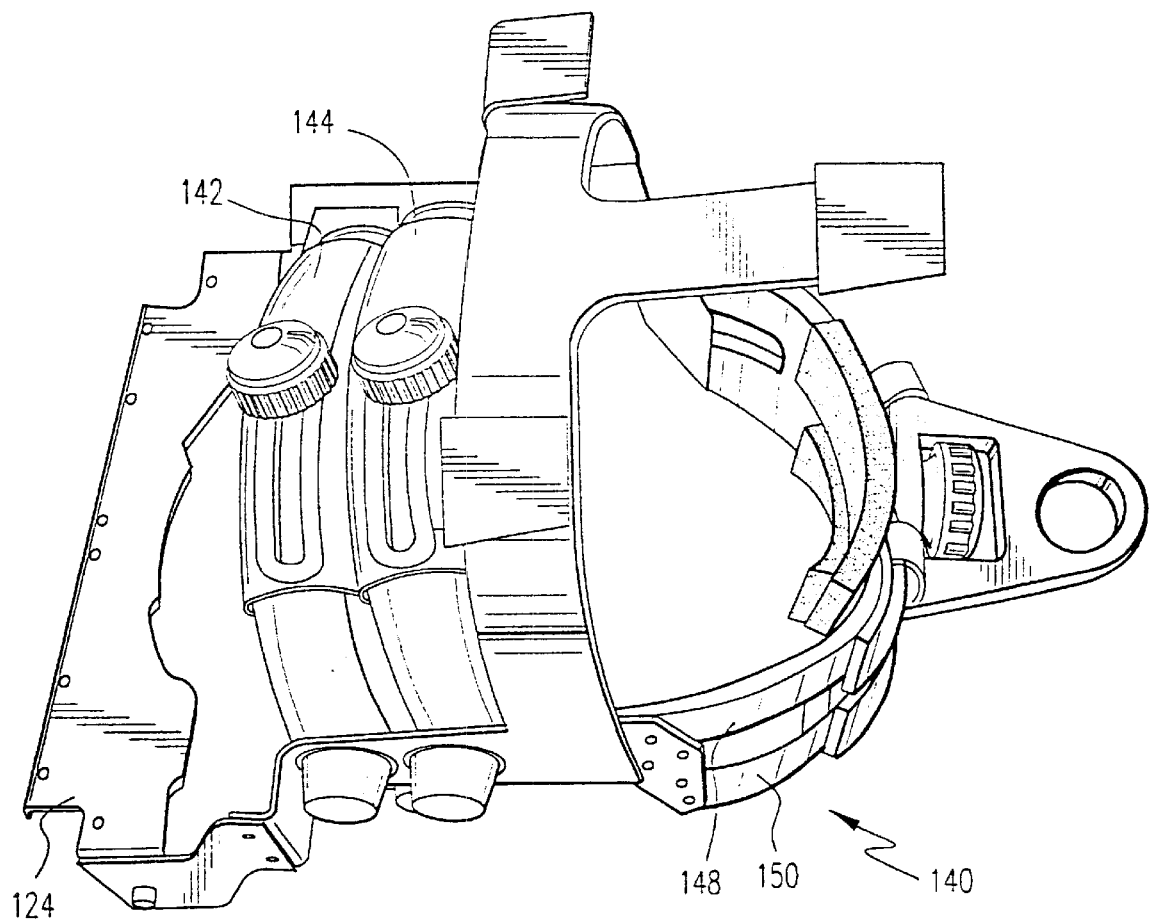
FIG. 20 is a top perspective view of the helmet for mounting the head mounted display on a user's head.
Figure 21A:
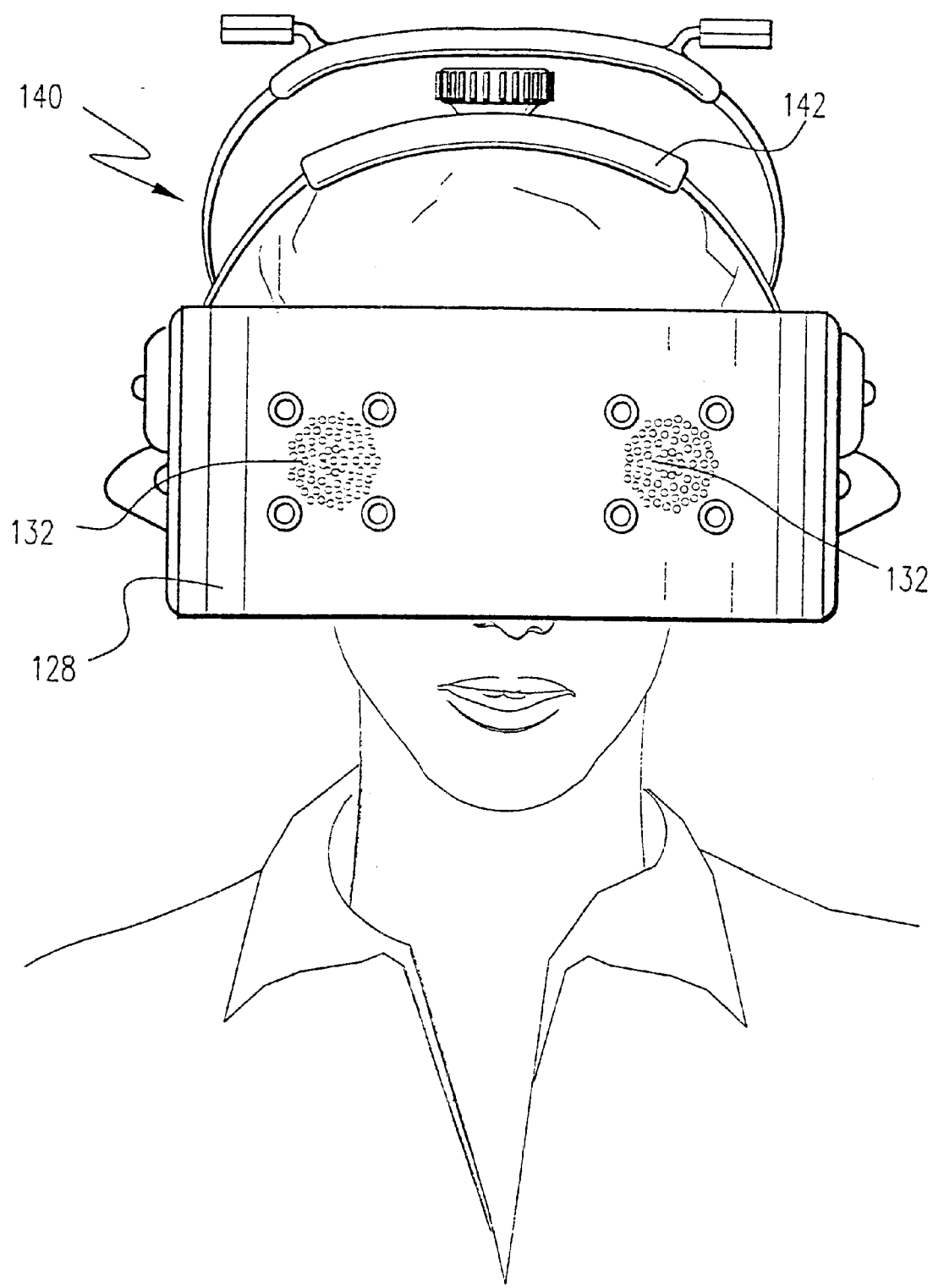
FIG. 21(a) is a front view of a user wearing the head mounted display of the present invention.
Figure 21B:
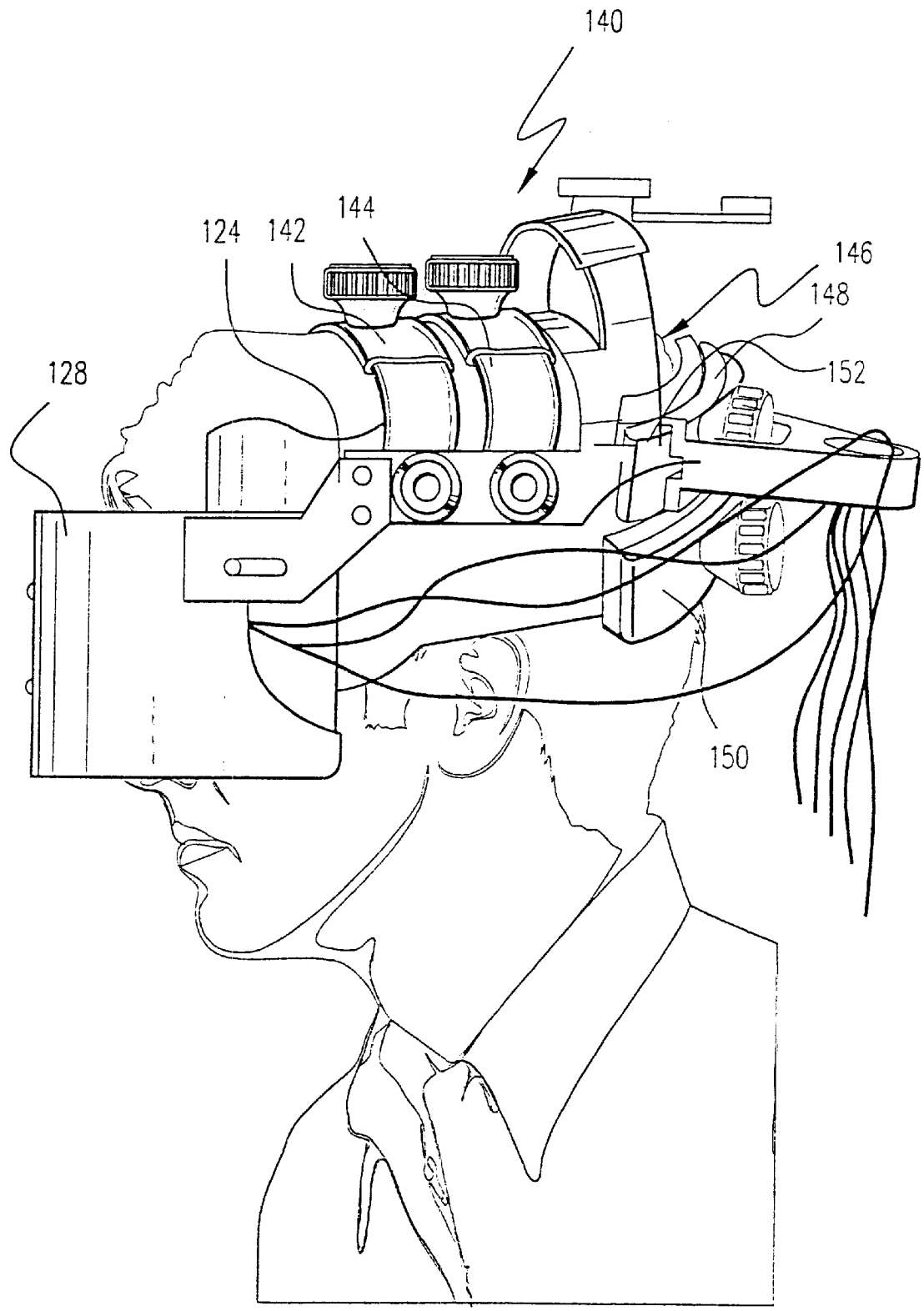
FIG. 21(b) is a side view of a user wearing the head mounted display of the present invention.

As shown in FIGS. 20, 21a and 21b, the head support is a helmet 140, to which there is attached the frame 124 that supports the display system and the cover 128, which encloses the display system. The helmet 140 consists of two adjustable straps 142 and 144 that course over the top of a user's head 146 and two adjustable straps 148 and 150 that course around the rear of the head 146. One of the rear straps 148 covers the occiput 152 and the other strap 150 contacts the head 146 below the occiput 152. The two straps 142 and 144 on the top of the head 146 control the elevation and tilt of the displays 72. The rear straps 148 and 150 pull the displays 72 toward the face 154; the strap 150 below the occiput 152 prevents the helmet 140 from rotating forward. The positions of the displays 72 relative to the eyes can be adjusted where the helmet 140 attaches to the display system suspension frame 124.

The electronics system (not shown) for driving the Planar displays preferably consists of well known A/D converters and video memory for each display to buffer the R, G, and B signals from the graphics cards; clocks, control signals, and timing logic to read out the R, G, and B images sequentially and in synchrony with the switching of the LCCS; LCCS drivers; encoders and pulse generators to convert the gray level of each pixel to a burst of pulses that drive the displays; and high voltage power supplies. The Micron display electronics (not shown) are also conventional in design. This display does not require synchronization with a color shutter since it is a pattern color display. No A/D converter or video memory is needed because it is an analog device. However, the input signal must be converted from the VGA that comes out of a graphics card to NTSC using VGA to NTSC encoders.

In the preferred embodiment of the present invention, there is a conventional circuit card for each display which is mounted in a card rack (not shown) to integrate all of the electronics into a single chassis with a single power supply.

Other electronics components included in the chassis consist of off-the-shelf power supplies and amplifiers for the eye tracking video cameras 116, off-the-shelf power supplies for infrared light emitting diodes (not shown) used to illuminate a user's eyes for tracking purposes, and off-the-shelf power supplies for the fans 130 that cool the displays 72. There are input jacks for the display cables from the computers, output jacks for the display cables to the HMD, and output jacks for the eye tracker video signals to the eye tracking computer 110.

The preferred embodiment of the present invention uses a commercial head tracking system 111, called the InterSense IS-600 (not shown), which does position tracking using accelerometry with ultrasonic drift correction. The IS-600 preferably uses a solid state inertial measurement unit to sense angular rate of rotation and linear acceleration, both with three degrees-of-freedom. The angular rates are integrated to provide measures of pitch, yaw, and roll. The linear acceleration is integrated twice to provide measures of translation in x, y, and z. Preferably, ultrasonic distance measures, using time of flight data, provide measures of starting position and are used to correct drift in the inertial tracker (from accumulated error).

The maximum angular rate that can be measured by the IS-600 is 1200°/sec. Rotation resolution is 0.02° rms (1.2 minutes) with an accuracy of 0.25° rms (15 minutes). The maximum linear velocity that can be measured by the IS-600 is 15 ft/sec. Translation resolution is 255 $\mu$m with an accuracy of 6.3 mm. The maximum sampling rate is 150 Hz.

Lag with the IS-600 is imperceptible because of feedforward motion prediction. The InterSense algorithm can predict motion up to 50 msec ahead, so renderings for new viewpoints can be updated in anticipation of the head position.

Figure 22:
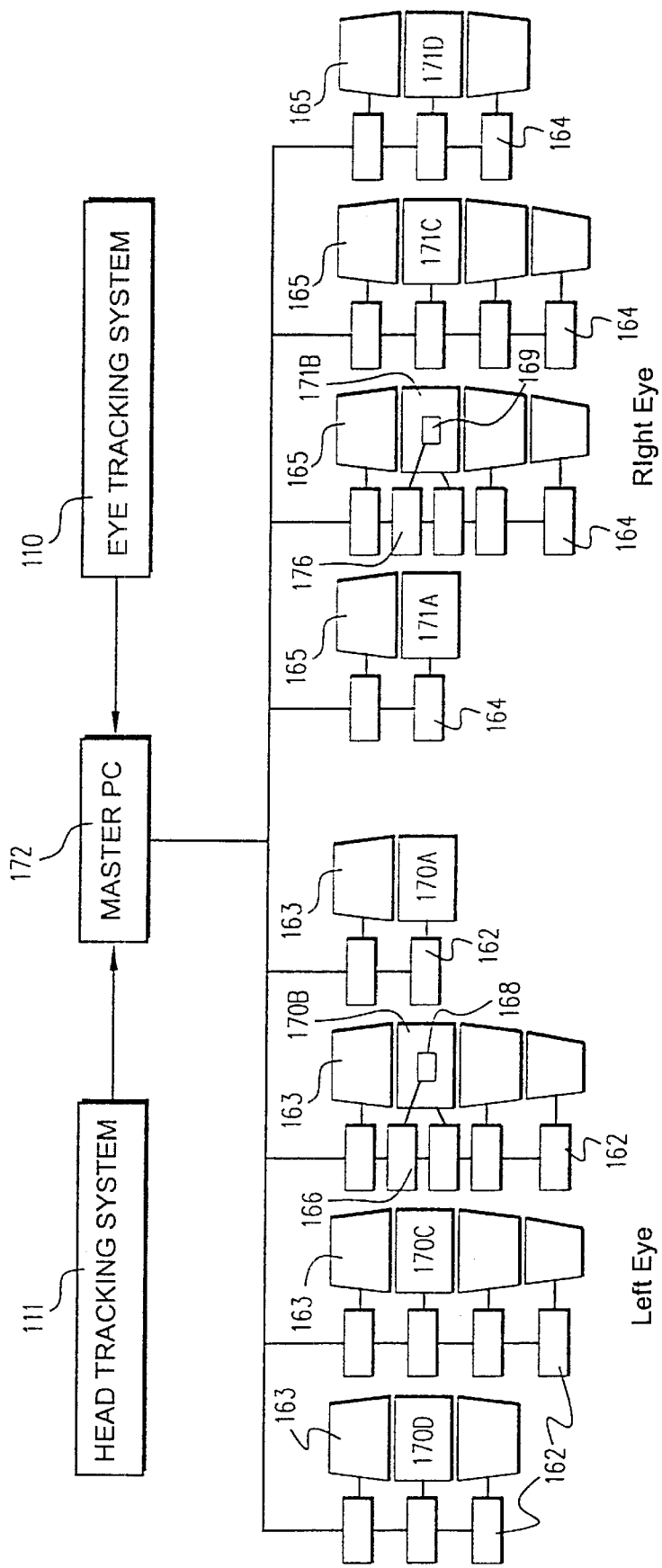
FIG. 22 is a block diagram of a networked computer system for driving the head mounted display of the present invention.

The preferred embodiment of the present invention has 14 million full color pixels that are preferably driven at a 60 Hz frame rate. To meet this requirement, the present invention preferably uses a parallel graphics architecture, comprising a distributed network of personal computers or alternatively, an SGI graphics supercomputer with multiple graphics channels. FIG. 22 is a block diagram of a networked computer system used to control the head mounted display of the preferred embodiment of the present invention. Preferably, slave PCs, shown as rectangles 162 for the left eye and as rectangles 164 for the right eye each drive a display (represented by rectangular and trapezoidal facets 163 for the left eye and 165 for the right eye). The slave PCs 162 and 164 each preferably use a 350 MHz Pentium II or faster processor and an AGP video card (both not shown) to drive the respective displays 163 and 165. Separate slaves PCs 166 and 167 preferably generate high level of detail ("LOD") roaming windows shown as small squares 168 and 169 inside rectangular central display facet in each eye. The images in the high LOD windows 168 and 169 are mixed with the images for the central displays 170 and 171 preferably using a Synchromaster 300 video mixer (not shown). A master PC 172 collects head tracking data from the IS-600 172 and eye tracking data from the eye tracker computer 110. The head position data is used to update the viewpoint for each slave PC 162 and 164, and the eye position data is used to update the display coordinates of the high LOD roaming windows 168 and 169.

Thus, there is one PC 162 or 164 for each of the 28 displays 72 in the HMD (including the PCs 166 and 167 that generate the high resolution insets 168 and 169), a PC 110 that tracks eye positions, and the master PC 172 that records head position, manages the network, a fast Ethernet, and that updates the model of the virtual environment to be displayed. The processor for each of these computers is preferably a 350 MHz Pentium II or faster processor, as mentioned above. Each computer also preferably has at least 256 Mbytes of PC 100 SDRAM and a fast Ethernet card (both not shown). Each of the 28 slave computers 162 and 164 preferably has an AGP video card (not shown). The central displays 170A–D and 171A–D and roaming windows 168 and 169 in each eye are preferably driven with MaxVision Titan II graphics processors (3.3 million triangles per second) (not shown). The remaining 18 displays are preferably driven with Diamond Fire GL Pro 1000 graphics processors (1 million triangles per second) (not shown).

Two VGA video mixers (RGB Spectrum Synchromaster 300) (not shown) are preferably used to mix the video images for the central panel and the high LOD insert 138. The insert 138 is a square of approximately 10° that is centered on fixation. The video mixer superimposes the square on the video image for the central panels 170B and 171B. The image in the insert is identical to the image behind it, but rendered at a higher LOD. Eye position coordinates obtained from the IS-600 eye tracker determine the location of the inserts 168 and 169 on their respective central displays 170B and 171B.

Eye tracking is accomplished preferably using a separate PC 10, also equipped with at least a 350 MHz Pentium II processor, 256 Mb SDRAM, and a fast Ethernet card. Preferably, two pupil-tracking boards are mounted on the bus. In the preferred embodiment, these pupil-tracking boards are EPIC boards made by Eye Dynamics. The EPIC boards digitize the video images of the pupil from the CCD cameras 116, threshold the images, use fuzz logic algorithms to identify the pupil borders, and locate the pupil centers with an algorithm that calculates the center of gravity (average x and y values of all pixels within the pupil). Preferably, the frame rate is 60 Hz and the total lag for the camera plus digitizer is two frames (33 msec.). The output of the boards are x,y coordinates of the pupil centers and the pupil area. The pupil area can be used to identify blinks and artifacts. The eye rotation resolution is preferably better than 30 minutes.

The 3-D graphics model of the virtual environment to be displayed by the parallel graphics architecture is loaded into the master computer 172. In the preferred embodiment, the master computer 172 preferably runs under Windows 98 or equivalent operating system. The master computer 172 downloads copies of the model of the virtual environment to be displayed to each of the slave computers 162 and 164. The slaves preferably run under Windows NT or equivalent operating system. The eye tracking computer 110 runs preferably under DOS.

Figure 23:
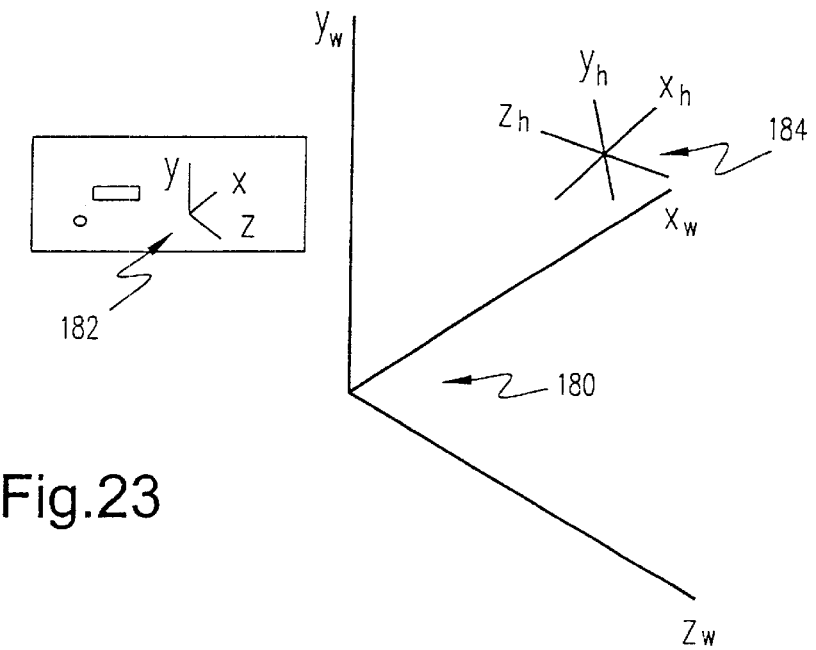
FIG. 23 is a graph showing the relationships between the real world coordinates and the head and virtual coordinates used by the head mounted display of the present invention.

The parallel graphics architecture has to keep track of three coordinate systems shown in FIG. 23. The real world coordinate system 180 is used to specify the position and orientation of the user's head and other parts of his/her body. In the preferred embodiment, the IS-600 measures the position and orientation of a user's head in real world coordinates 180. A virtual world coordinate system 182 maps onto the real world coordinate system 180. Within the parallel graphics architecture, the 3-D model and spatial relations of objects in the model are specified in virtual world coordinates 182. The user's head position and orientation 184 is also expressed as a viewpoint (not shown) in the virtual world coordinate system 182. The eye tracker data, for example, is provided in head coordinates.

Each slave computer 162 and 164 is assigned a position and orientation in the head coordinate system 184

(corresponding to the position and orientation of the display it is driving). The position of the viewpoint for each slave 162 and 164 corresponds to the center of the right or left eye. The orientation of the viewpoint is directed toward the slave's display. Consequently, each slave displays a part of the virtual world that corresponds to its position and orientation in head coordinates (given the head coordinate system position and orientation in world coordinates). The resulting wide field display of the virtual environment is a montage.

As the user moves his head, the master computer 172 records head position and orientation in world coordinates 180. The master computer 172 then orders the slaves 162 and 164 to update their respective viewpoints to reflect the new position and orientation of the head in virtual world coordinates 182. As the user moves his eyes, the master computer 172 orders the slaves 162 and 164 responsible for the high LOD roaming windows 168 and 169 to update its image according to the new eye position.

The parallel graphics architecture software implements a freeze "frame" feature when a user's head is moving rapidly, since the system, in normal operation, would put up images that would be grossly incorrect by the time they are fully displayed. This gives rise to image slip. When the freeze frame feature is active, the DGS freezes the previous image until the head slows or stops. Then the system updates the image, displaying the correct part of the virtual world for the new head position and orientation.

The freeze frame algorithm depends on two parameters, which can be set as options to the master program. The command, "master–htDelay 12–freeze 1.7", sets the program to request head coordinates 184 from the head tracker approximately every 12 milliseconds. If the yaw has changed by more than 1.7 degrees from the last coordinates, the freeze frame is triggered. Therefore the minimum speed to cause a freeze frame is about 1.7 degrees/12 milliseconds=141.7 degrees/second. Of course, any values can be specified in the command line.

Using both hardware and software, it is possible to include roaming windows 168 and 169 containing higher detail within the center panels 170B and 171B of the headsets. The placement of the windows is determined by the eye tracking, so that when the user is looking at the central panel, he is looking directly at the higher detail windows.

The master computer 172 downloads display calibrations to the slaves 162 and 164. The calibration files consist of display alignment (relative viewpoint calibration) and color and gray scale mapping.

Figure 24:
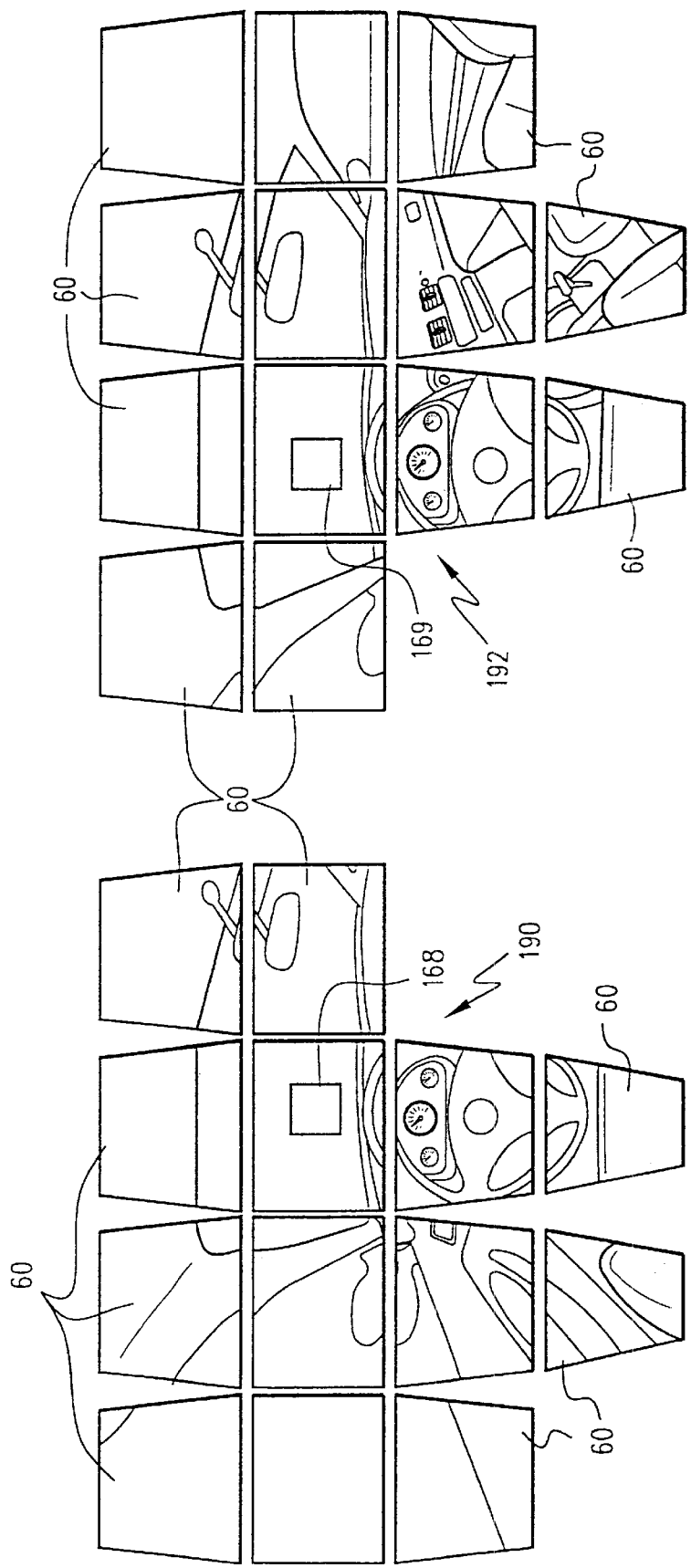
FIG. 24 is an exploded view of left and right eye displays as seen through the lens facets in the head mounted display of the present invention.

FIG. 24 is an exploded view of left and right eye displays 190 and 192, as seen through lens facets 40 in the head mounted display of the present invention. Each display 60 has a portion of the image corresponding to its assigned position in the visual field. The full field virtual environment is a montage. The displayed environment is a 3-D model of an automobile. The squares 168 and 169 represent the high LOD roaming windows discussed above. If the high LOD roaming windows are free fused, the image is seen in stereo.

The preferred embodiment of the head mounted display of the present invention has monocular fields of view of about 50° nasal, 85° temporal (135° horizontal), 40° superior, and 65° inferior (105° vertical). The binocular overlap is about 100°, giving a binocular field of view of about 170°. Visual resolution is approximately 3.75 min/pixel everywhere in the visual field except from about 45° to 65° in the inferior field, where the resolution is approximately 6.8 min/pixel.

Figure 25:
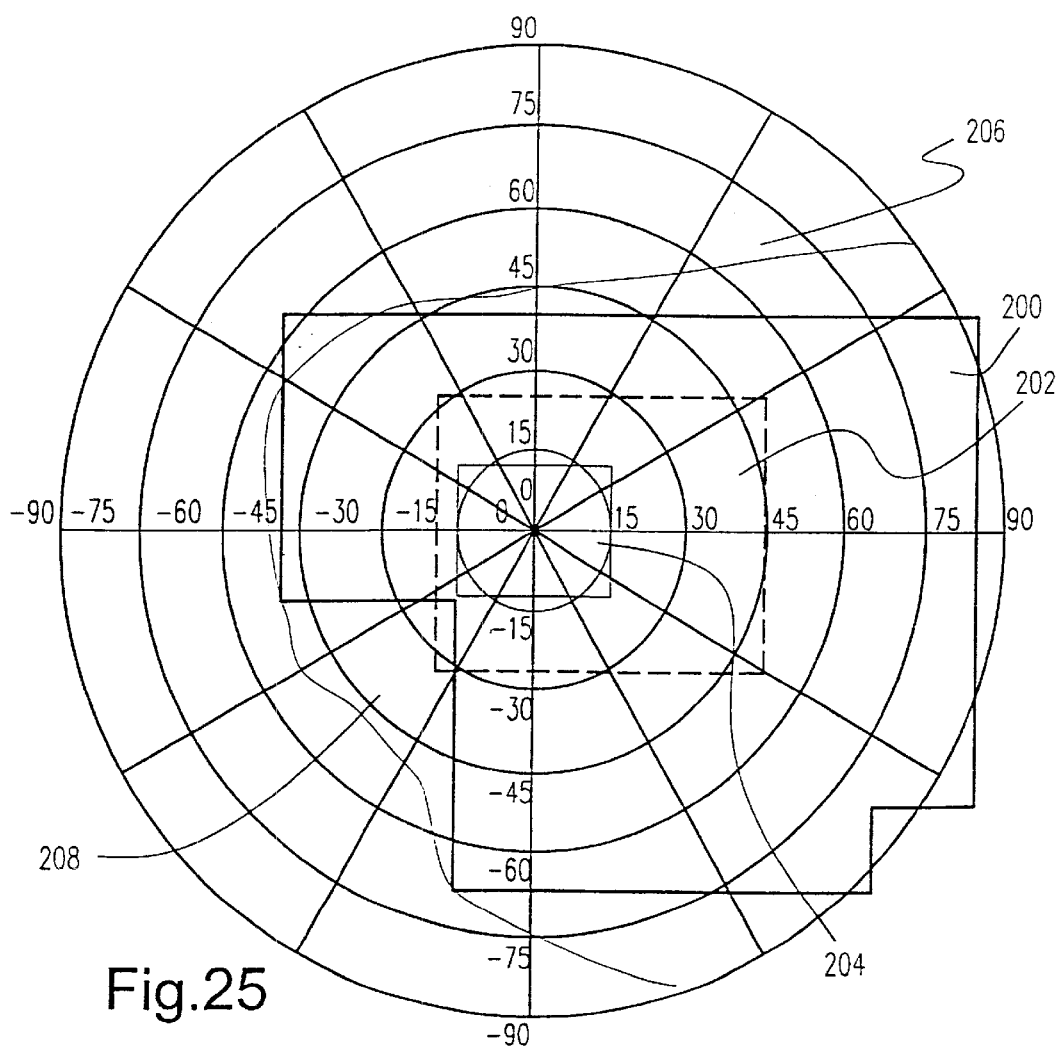
FIG. 25 is a graph comparing for the right eye the visual field of the head mounted display of the present invention to that provided by the Datavisor 80 and Pro View 80 displays.

FIG. 25 compares the right eye visual field area 200 for the head mounted display of the present invention to the right eye visual field area 202 for the Datavisor 80 or Pro View 80 and to the right eye visual field area 204 for the Glasstron. The larger area 206 represents the average normal visual field (mean of 100 subjects). The head mounted display of the present invention underfills the inferior nasal field 208, but otherwise almost completely fills the rest of the visual field 206.

In testing the preferred embodiment of the present invention, it has been noticed that some people see visible seams between displays, while others do not see any seams. The appearance of seams seems to depend on pupil size, as well as alignment when the HMD is put on. The video cameras 116 that image the pupil help with alignment, but people with large pupils are likely to see some seams. As illustrated in FIG. 10, the pupil vignettes the image on the retina. Using display image overlap based on the assumption of a 5 mm pupil, people with very small pupils (<3 mm) will see gaps between neighboring displays because the pupil vignetting will cut off too much of the image. It should be noted, however, that at the display luminance levels typically used in HMDs, a pupil that small would only occur in people with meiosis or people who are taking one form of glaucoma medication that constricts the pupil. People with pupils much larger than 5 mm will see beyond the borders of the displays through the windows of the lens facets. Consequently, for these people, there will be an abrupt border with the area beyond the display that will appear overlapped with the neighboring display image (creating a dark band at the border), rather than a feathering of the image into the feathering of the neighboring image (as shown in FIG. 10). Theoretically, this should not be a problem, but the non-linearities in retinal spatial processing, which give rise to neural contrast enhancement and Mach band illusions, enhance the visibility of the edge. One possibility is to increase the magnification of the display to accommodate larger pupil sizes. This, however, would require reconstruction of the entire lens arrays 62 with shorter focal length lenses and the replacement of the glass blocks 96 with thicker blocks to move the virtual image of the display closer to the lens.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. A head mounted display comprising for each eye of a user of the display:

a plurality of lenses positioned relative to one another as though each of the lenses is tangent to a surface of a first sphere having a center that is located substantially at a center of rotation of an eye of a user of the head mounted display; and a plurality of displays positioned relative to one another as though each of the displays is tangent to a surface of a second sphere having a radius larger than the first sphere's radius and having a center that is located at the center of rotation of the eye of the user;

wherein each of the displays corresponds to at least one of the lenses, and is imaged by the corresponding lens.

2. A head mounted display as recited in claim 1, wherein the plurality of lenses are joined together to form a wide field array of lens facets.

3. A head mounted display as recited in claim 2, wherein the wide field array of lens facets forms a montage of display images on the eye's retina.

4. A head mounted display as recited in claim 3, wherein the montage of display images formed on the retina is substantially seamless.

5. A head mounted display as recited in claim 3, wherein the montage of display images formed on the retina extends to substantially 85° temporal field and substantially 50° nasal field.

6. A head mounted display as recited in claim 1, wherein each of the lenses is a Fresnel lens.

7. A head mounted display as recited in claim 1, wherein the plurality of displays are paneled together to form a video wall providing a wide field of view.

8. A head mounted display as recited in claim 1, wherein each of the displays is a miniature flat panel video display.

9. A head mounted display as recited in claim 1, wherein each of the displays is a high resolution video display.

10. A head mounted display as recited in claim 1, wherein each of the displays is an emissive display.

11. A head mounted display as recited in claim 1, wherein each of the displays is a reflective display.

12. A head mounted display as recited in claim 11 further comprising:
    a light source for illuminating the displays; and
    a beam splitter positioned between the displays and the lenses.

13. A head mounted display as recited in claim 12, wherein the lenses are arranged in two rows, the displays are arranged in two rows, and the light source is positioned outside a field of view through the lenses.

14. A head mounted display as recited in claim 1 further comprising a glass plate mounted on each display for magnifying a display image.

15. A head mounted display as recited in claim 1 further comprising for each eye an eye tracker for measuring eye position.

16. A head mounted display as recited in claim 15 wherein each eyetracker includes
    a beam splitter positioned between a central display of said plurality of displays and a corresponding central lens of said plurality of lenses; and
    a video camera mounted above the beam splitter.

17. A head mounted display as recited in claim 15 wherein the video camera is a charge coupled device video camera.

18. A head mounted display comprising:
    a first array of lenses positioned tangential to a surface of a first imaginary sphere having a center that is located substantially at a center of rotation of a first eye of a user of the head mounted display;
    a first wall of video displays positioned tangential to a surface of a second sphere having a radius larger than the first sphere's radius and having a center that is located at the center of rotation of the first eye;
    a second array of lenses positioned tangential to a surface of a third imaginary sphere having a center that is located substantially at a center of rotation of a second eye of the user of the display;
    a second wall of video displays positioned tangential to a surface of a fourth sphere having a radius larger than the third sphere's radius and having a center that is located at the center of rotation of the second eye;
    each display included in the first wall of video displays having a corresponding lens in the first array of lenses, and being imaged by the corresponding lens; and
    each display included in the second wall of video displays having a corresponding lens in the second array of lenses, and being imaged by the corresponding lens.

19. A head mounted display as recited in claim 18, wherein each of the first and second arrays of lens forms a montage of display images on the retinas of the first and second eyes, respectively.

20. A head mounted display as recited in claim 19, wherein the montages of display images formed on the retinas are substantially seamless.

21. A head mounted display as recited in claim 19, wherein each of the montages of display images formed on the retinas extends to substantially 85° temporal field and substantially 50° nasal field.

22. A head mounted display as recited in claim 18, wherein each of the lenses forming the first and second arrays is a Fresnel lens.

23. A head mounted display as recited in claim 18, wherein the first and second arrays of lenses are each a wide field array.

24. A head mounted display as recited in claim 18, wherein each of the first and second video walls of displays provides a wide field of view.

25. A head mounted display as recited in claim 18, wherein each of the displays forming the first and second video walls is a miniature flat panel video display.

26. A head mounted display as recited in claim 18, wherein each of the displays forming the first and second video walls is a high resolution video display.

27. A head mounted display as recited in claim 18, wherein each of the displays forming the first and second video walls is an emissive display.

28. A head mounted display as recited in claim 18, wherein each of the displays forming the first and second video walls is a reflective display.

29. A head mounted display as recited in claim 18 further comprising a glass plate mounted on each display for magnifying a display image.

30. A head mounted display as recited in claim 18 further comprising
    a first eye tracker including
        a first beam splitter positioned between a first central display of said first wall of video displays and a corresponding first central lens of said first array of lenses;
        a first video camera mounted above the beam splitter; and
    a second eye tracker including:
        a second beam splitter positioned between a second central display of said second wall of video displays and a corresponding central lens of said second array of lenses; and
        a second video camera mounted above the beam splitter.

31. A head mounted display as recited in claim 30 wherein the first and second video cameras are each charge coupled device video cameras.

32. A system for displaying a virtual environment comprising:
    a head mounted display including:
        a first array of lenses positioned tangential to a surface of a first imaginary sphere having a center that is located substantially at a center of rotation of a first eye of a user of the head mounted display;
        a first wall of video displays for displaying the virtual environment, said first wall of video displays being positioned tangential to a surface of a second sphere having a radius larger than the first sphere's radius and having a center that is located at the center of rotation of the first eye;

a second array of lenses positioned tangential to a surface of a third imaginary sphere having a center that is located substantially at a center of rotation of a second eye of the user of the head mounted display;

a second wall of video displays for displaying the virtual environment, said second wall of video displays being positioned tangential to a surface of a fourth sphere having a radius larger than the third sphere's radius and having a center that is located at the center of rotation of the second eye, each display included in the first wall of video displays having a corresponding lens in the first array of lenses, and being imaged by the corresponding lens; and each display included in the second wall of video displays having a corresponding lens in the second array of lenses, and being imaged by the corresponding lens;

a first tracking system for tracking positions of said first and second eyes;

a second tracking system for sensing and tracking position, orientation and movement of said user's head relative to a predetermined coordinate system; and a distributed computer system for driving said first and second walls of video displays to display the virtual environment.

33. A system for displaying a virtual environment as recited in claim 32 wherein the first tracking system includes:

a first beam splitter positioned between a first central display of said first wall of video displays and a corresponding first central lens of said first array of lenses;

a first video camera mounted above the beam splitter;

a second beam splitter positioned between a second central display of said second wall of video displays and a corresponding second central lens of said second array of lenses;

a second video camera mounted above the beam splitter; and a computer for tracking eye position data received from said first and second video cameras.

34. A system for displaying a virtual environment as recited in claim 32 wherein the second tracking system includes:

a measuring unit to sense position, orientation and movement of a user's head relative to a predetermined coordinate system; and a computer for tracking head position, orientation and movement data received from said measuring unit.

35. A system for displaying a virtual environment as recited in claim 32 wherein the distributed computer system includes:

a first plurality of slave computers and drivers for driving said first wall of video displays to display the virtual environment;

a second plurality of slave computers and drivers for driving said second wall of video displays to display the virtual environment; and a master computer for monitoring and controlling the operation of said first and second slave computers and drivers.

36. A system for displaying a virtual environment as recited in claim 35 wherein the distributed computer system implements a "freeze frame" feature when a user's head is moving rapidly to avoid image slip.

37. A system for displaying a virtual environment as recited in claim 32 wherein the distributed computer system further includes first and second separate slaves computers for generating first and second high level of detail roaming windows inside respective central displays of said first and seconds wall of video displays for said first and second eyes.

38. A system for displaying a virtual environment as recited in claim 32 wherein each of the first and second arrays of lens forms a montage of display images on the retinas of the first and second eyes, respectively.

39. A system for displaying a virtual environment as recited in claim 32 wherein each of the lenses forming the first and second arrays is a Fresnel lens.

40. A system for displaying a virtual environment as recited in claim 32 wherein the first and second arrays of lenses are each a wide field array.

41. A system for displaying a virtual environment as recited in claim 32 wherein each of the first and second video walls of displays provides a wide field of view.

42. A system for displaying a virtual environment as recited in claim 32 wherein each of the displays forming the first and second video walls is a miniature flat panel video display.

43. A system for displaying a virtual environment as recited in claim 32 wherein each of the displays forming the first and second video walls is a high resolution video display.

44. A system for displaying a virtual environment as recited in claim 32 wherein each of the displays forming the first and second video walls is an emissive display.

45. A system for displaying a virtual environment as recited in claim 32 wherein each of the displays forming the first and second video walls is a reflective display.

46. A system for displaying a virtual environment as recited in claim 32 wherein the head mounted display further comprises a helmet for supporting and a cover for enclosing the first and second arrays of lenses and the first and second walls of video displays.

47. A system for displaying a virtual environment comprising:

a head mounted display including:

a first array of lenses positioned tangential to a surface of a first imaginary sphere having a center that is located substantially at a center of rotation of a first eye of a user of the head mounted display;

a first wall of video displays for displaying the virtual environment, said first wall of video displays being positioned tangential to a surface of a second sphere having a radius larger than the first sphere's radius and having a center that is located at the center of rotation of the first eye;

a second array of lenses positioned tangential to a surface of a third imaginary sphere having a center that is located substantially at a center of rotation of a second eye of the user of the head mounted display;

a second wall of video displays for displaying the virtual environment, said second wall of video displays being positioned tangential to a surface of a fourth sphere having a radius larger than the third sphere's radius and having a center that is located at the center of rotation of the second eye;

each display included in the first wall of video displays having a corresponding lens in the first array of lenses, and being imaged by the corresponding lens; and each display included in the second wall of video displays having a corresponding lens in the second array of lenses, and being imaged by the corresponding lens;

an eye tracking system including:
- a first beam splitter positioned between a first central display of said first wall of video displays and a corresponding first central lens of said first array of lenses, a first video camera mounted above the beam splitter;
- a second beam splitter positioned between a second central display of said second wall of video displays and a corresponding second central lens of said second array of lenses;
- a second video camera mounted above the beam splitter; and
- a first computer for tracking eye position data received from said first and second video cameras;

a head tracking system including:
- a measuring unit to sense position, orientation and movement of a user's head relative to a predetermined coordinate system; and
- a second computer for tracking head position, orientation and movement data received from said measuring unit; and a control system including:
- a plurality of third computers for driving said first wall of video displays to display the virtual environment;
- a plurality of fourth computers for driving said second wall of video displays to display the virtual environment; and
- a fifth computer for monitoring and controlling the operation of said first, second third and fourth computers.

48. A head mounted display comprising for each eye of a user of the display:

- a plurality of lenses positioned relative to one another as though each of the lenses is tangent to a surface of a first sphere having a center that is located substantially at a center of rotation of an eye of a user of the head mounted display; and
- a plurality of displays positioned relative to one another as though each of the displays is tangent to a surface of a second sphere having a radius larger than the first sphere's radius and having a center that is located at the center of rotation of the eye of the user;

each of the displays corresponding to one of the lenses, whereby the displays are imaged with their corresponding lenses to form overlapping adjacent display images.

49. The head mounted display as recited in claim 48, wherein there is an overlap of at least 5 degrees between the adjacent display images.

50. The head mounted display as recited in claim 49, wherein the overlap is in a range of approximately 10 to 15 degrees.

51. The head mounted display as recited in claim 49, wherein the overlapping display images form a montage of display images on the eye's retina.

52. A head mounted display as recited in claim 51, wherein the montage of display images formed on the retina is substantially seamless.

53. A head mounted display as recited in claim 51, wherein the montage of display images formed on the retina extends to substantially 85° temporal field and substantially 50° nasal field.

* * * * *